(12) United States Patent
Foote et al.

(10) Patent No.: US 6,182,179 B1
(45) Date of Patent: Jan. 30, 2001

(54) SYSTEM THAT IS ABLE TO READ AND WRITE USING A TRANSMISSION MEDIUM AND IS ABLE TO READ STORED INFORMATION VIA A MODEL INFORMATION STRUCTURE USING A DIFFERENT TRANSMISSION MEDIUM

(75) Inventors: Garritt W. Foote; Pratik Mehta, both of Austin, TX (US)

(73) Assignee: National Instruments Corporation, Austin, TX (US)

(*) Notice: Under 35 U.S.C. 154(b), the term of this patent shall be extended for 0 days.

(21) Appl. No.: 09/062,841

(22) Filed: Apr. 20, 1998

(51) Int. Cl.$^7$ ........................................... G06F 13/38
(52) U.S. Cl. ........................... 710/128; 710/5; 710/9; 710/11; 710/126; 710/100; 710/260; 700/3; 714/129; 370/364
(58) Field of Search ................... 370/85; 364/132, 364/200; 395/325, 275, 250, 306; 371/21.2; 710/128, 5, 260, 9

(56) References Cited

U.S. PATENT DOCUMENTS

| | | | |
|---|---|---|---|
| 4,459,655 | * 7/1984 | Willemin | 364/131 |
| 4,535,448 | * 8/1985 | Baxter et al. | 370/85 |
| 4,890,224 | * 12/1989 | Fremont | 364/200 |
| 5,185,866 | * 2/1993 | Francisco | 395/325 |
| 5,404,460 | * 4/1995 | Thomsen et al. | 395/275 |
| 5,596,724 | * 1/1997 | Mullins et al. | 395/250 |
| 5,649,124 | * 7/1997 | Kreidl | 395/306 |
| 5,815,509 | * 9/1998 | Deng et al. | 371/21.2 |
| 5,875,349 | * 2/1999 | Cornaby et al. | 395/825 |

OTHER PUBLICATIONS

SIXTRAK Programmable I/O for Windows, product brochure, ©Copyright 1996, Digitronics SIXNET, 4 pages.
SYSTRON® Flexible I/O's programmable controller, product brochure, Mar. 1998, 12 pages.
Personal Daq™: Portable USB Data Acquisition, product brochure, ©Copyright 1997, Iotech Inc., 2 pages.

(List continued on next page.)

*Primary Examiner*—Paul R. Lintz
*Assistant Examiner*—Jibreel Speight
(74) *Attorney, Agent, or Firm*—Conley, Rose & Tayon; Jeffrey C. Hood

(57) ABSTRACT

A modular distributed I/O system includes a computer coupled to module banks through a network bus. A module bank includes a communication module, terminal bases, and I/O modules. The adjoined terminal bases form a local bus mastered by the communication module. The I/O modules connect to the local bus through terminal bases. I/O modules are pluriform and programmable. The communication module maintains a memory image of the configuration state of each I/O module resident in the module bank. A memory image persists when an I/O module is removed from its terminal base. The memory image is used to configure a new I/O module which is inserted into the same terminal base. The communication module monitors for communication failure on the network bus, and is configured to capture the state of the module bank and automatically restore this captured state after a power-loss event. The terminal bases realize a local bus which includes a parallel bus, a serial bus, and an address assignment bus. Each terminal base receives a value from a preceding terminal base, increments this value, and asserts the increment value to a succeeding terminal base. Each terminal base is automatically assigned an physical proximity address. An I/O module controls read/write access to its register space by a semaphore mechanism which supports multi-threaded processing. The I/O module latches an ungranted semaphore request and assumes a self-exclusion state upon releasing the semaphore wherein the semaphore is reserved for the communication module.

15 Claims, 23 Drawing Sheets

OTHER PUBLICATIONS

Flexible and Modular I/O Design Lowers Installation, Wiring and Maintenance Costs: Product Profile from Rockwell Automation ©Copyright 1994, Allen–Bradley Company Inc., 4 pages.

The birth of . . . our latest RevolutI/On by WAGO Corporation, product brochure, Aug. 31, 1995, 6 pages.

WINbloc . . . puts I/O right on track: product information from Weidmüller: The Interface Partner, Oct. 1995, 10 pages.

Beckhoff Bus–Klemme: Der universelle Grundbaustein für die Automatesierungstechnik, German–language product brochure, from Beckhoff Indstrie Elektonik, 1996, 17 pages.

Total Solutions for PC–based Industrial Automation, Solution Guide vol. 71, by Advantech, Feb. 1997, 31 pages.

FLEX I/O (Catalog No. 1794) Product Data, Apr. 1997, 6 pages.

* cited by examiner (Right View)

(Top View)

(Left View)

Physical Interface Table

|   |            | Direction@ |                       | Use with:  |          |          |              |               |
|---|------------|------------|-----------------------|------------|----------|----------|--------------|---------------|
| # | Signal name| N.M.       | Full Name             | I/O read   | I/O write| MIS read | Config write | Mod. Status   |
| 1 | BA[3]      | OUTPUT     | Base Address bit 3    | x | x | x | x | x |
| 2 | BA[2]      | OUTPUT     | Base Address bit 2    | x | x | x | x | x |
| 3 | BA[1]      | OUTPUT     | Base Address bit 1    | x | x | x | x | x |
| 4 | BA[0]      | OUTPUT     | Base Address bit 0    | x | x | x | x | x |
| 5 | MD[3]      | OUTPUT     | Module Select bit 3   | x | x | x | x | x |
| 6 | MD[2]      | OUTPUT     | Module Select bit 2   | x | x | x | x | x |
| 7 | MD[1]      | OUTPUT     | Module Select bit 1   | x | x | x | x | x |
| 8 | MD[0]      | OUTPUT     | Module Select bit 0   | x | x | x | x | x |
| 9 | CH[3]      | OUTPUT     | Channel Select bit 3  | x | x |   | x |   |
| 10| CH[2]      | OUTPUT     | Channel Select bit 2  | x | x |   | x |   |
| 11| CH[1]      | OUTPUT     | Channel Select bit 1  | x | x |   | x |   |
| 12| CH[0]      | OUTPUT     | Channel Select bit 0  | x | x |   | x |   |
| 13| WR*        | OUTPUT     | Write Pulse           |   | x |   |   |   |
| 14| RD*        | OUTPUT     | Read Pulse            |   | x |   | x | x |
| 15| FC[2]      | OUTPUT     | Function Code bit 2   | 0 | 0 |   | 0 | 0 |
| 16| FC[1]      | OUTPUT     | Function Code bit 1   | 1 | 1 |   | 1 | 0 |
| 17| FC[0]      | OUTPUT     | Function Code bit 0   | 1 | 1 |   | 0 | 0 |
| 18| D[7]       | Bi-Dir.    | Data bit 7            | x | x |   | x | x |
| 19| D[6]       | Bi-Dir.    | Data bit 6            | x | x |   | x | x |
| 20| D[5]       | Bi-Dir.    | Data bit 5            | x | x |   | x | x |
| 21| D[4]       | Bi-Dir.    | Data bit 4            | x | x |   | x | x |
| 22| D[3]       | Bi-Dir.    | Data bit 3            | x | x |   | x | x |
| 23| D[2]       | Bi-Dir.    | Data bit 2            | x | x |   | x | x |
| 24| D[1]       | Bi-Dir.    | Data bit 1            | x | x |   | x | x |
| 25| D[0]       | Bi-Dir.    | Data bit 0            | x | x |   | x | x |
| 26| CLK        | OUTPUT     | Blue Bus Clock        |   |   |   |   |   |
| 27| SPI_CS*    | OUTPUT     | SPI Channel Select    |   |   |   | x |   |
| 28| MOSI       | OUTPUT     | SPI Master Out Slave In |   |   |   | x |   |
| 29| MISO       | INPUT      | SPI Master In Slave Out |   |   |   | x |   |
| 30| SPI_CK     | OUTPUT     | SPI Clock             |   |   |   | x |   |
| 31| NEW_MD*    | INPUT      | New Module interrupt  |   |   |   |   |   |
| 32| RESET*     | OUTPUT     | Global Blue Bus Reset |   |   |   |   |   |
|   | +5V        |            | +5V power             |   |   |   |   |   |
|   | GND        |            | Ground                |   |   |   |   |   |

Fig. 12

Module Information Structure

| Description | Data Type |
|---|---|
| Module Description | |
| MIS Length | word integer |
| MIS Version Number | byte integer |
| Module ID | word integer |
| Hot Swap ID | byte integer |
| Module Name Length | byte integer |
| Module Name | string < 256 bytes |
| Serial Number | long word integer |
| Semaphore Request Time | byte integer |
| Number of CISes | byte integer |
| Number of Physical Channels | byte integer |

Channel Information Structures

| CIS #0 | |
|---|---|
|   CIS length in bytes | word integer |
|   CIS ID | word integer |
|   Channel Repetition Count | byte integer |
|   Channel Type | byte integer |
|   Points | byte integer |
|   Number of error messages (0, 1, or 2) | byte integer |
|   Error Message "A" (if num. Error messages = 1 or 2) | |
|     Error message ID | byte integer |
|     Message Length | byte integer |
|     Error Message "A" string | string < 256 bytes |
|   Error Message "B" (if num. error messages = 2) | |
|     Error message ID | byte integer |
|     Message Length | byte integer |
|     Error Message "A" string | string < 256 bytes |
|   Number of ranges | byte integer |
|   Range 0 description (Default Range) | |
|     Range ID | byte integer |
|     Data length | byte integer |
|     Data units | byte integer |
|     Lower Limit Value | 4 bytes |
|     Upper Limit Value | 4 bytes |
|   Range ... description | |
|   Range n description | |

Fig. 16A

Figure 16B: Channel Information Structures Continued

| Number of Attributes | byte integer |
|---|---|
| Attribute 0 description | |
|   Attribute ID | byte integer |
|   Attribute Name Length | byte integer |
|   Attribute Name | string < 256 bytes |
|   Attribute Length | byte integer |
|   Type of Settings | byte integer |
|   (Enumerated settings) | |
|     Number of Valid Settings | byte integer |
|     Setting 0 description | |
|       Setting ID | byte integer |
|       Setting Name Length | byte integer |
|       Setting Name | string < 256 bytes |
|     Setting ... description | |
|   (Integer settings) | |
|     Minimum Setting | byte integer |
|     Maximum Setting | byte integer |
|   Default Setting | byte integer |
| Attribute ... description | |
| Number of Commands Registers | byte integer |
| Command Register 0 description | |
|   Command Register ID | byte integer |
|   Command Register Name Length | byte integer |
|   Command Register Name | string < 256 bytes |
|   Command Length | byte integer |
|   Type of Commands | byte integer |
|   (Enumerated Commands) | |
|     Number of Valid Commands | byte integer |
|     Command 0 description | |
|       Command ID | byte integer |
|       Command Name Length | byte integer |
|       Command Name | string < 256 bytes |
|     Command ... description | |
|   (Integer Commands) | |
|     Minimum Value | byte integer |
|     Maximum Value | byte integer |
| Command Register ... description | |
| Command Register n description | |
| CIS N-1 | |

Fig. 16B

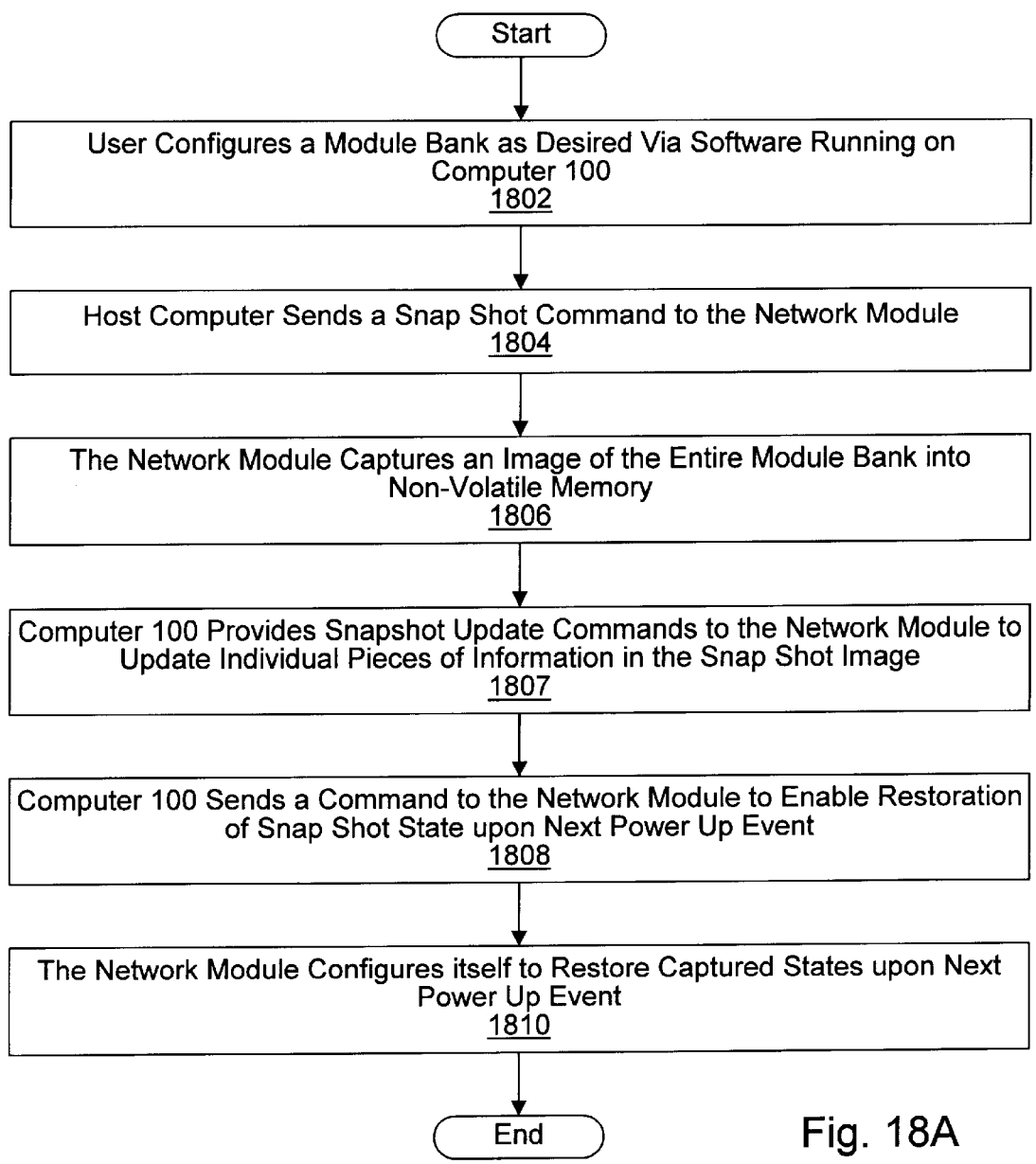

SYSTEM THAT IS ABLE TO READ AND WRITE USING A TRANSMISSION MEDIUM AND IS ABLE TO READ STORED INFORMATION VIA A MODEL INFORMATION STRUCTURE USING A DIFFERENT TRANSMISSION MEDIUM

FIELD OF THE INVENTION

The present invention relates to the field of distributed I/O systems, and more particularly, to a modular networked I/O system including a host computer and one or more module banks coupled via a network bus.

DESCRIPTION OF THE RELATED ART

In order to more efficiently and effectively address the problems associated with distributed sensing and control, providers of I/O devices and systems have evolved toward solutions which adhere to a common set of principles which include modularity, ease of configuration, and network operability.

For example, the 1794 Flex I/O product line manufactured by Allen-Bradley, a Rockwell Automation Business, comprises a modular I/O system for distributed applications. For more information concerning the Flex I/O product line refer to the Flex I/O Product Data Publication 1794-2.1 which is hereby incorporated by reference.

Another example is offered by the OpenLine™ product line manufactured by Grayhill, Inc. The OpenLine™ I/O system is a modular distributed control and data acquisition system. For more information concerning the OpenLineTM family of products refer to the OpenLine Product Data Bulletin #738 which is hereby incorporated by reference.

Prior art modular distributed I/O systems typically include a host computer coupled to one or more module banks through a network bus. The host computer sends command and configuration information to the module banks, and receives sensor data and status information from the module banks through the network bus. Each module bank generally includes a communication module, a plurality of terminal bases, and a plurality of I/O modules. The terminal bases couple together to form a communications backplane. The communication module generally couples to the first terminal base of the succession of terminal bases. The I/O modules are interchangably inserted into terminal bases. Each terminal base includes a host of connectors which provide the corresponding I/O module with connectivity to field devices. The communication module mediates communications between the network bus and the I/O modules comprising a module bank. The I/O modules occur in a variety of types for performing analog and/or digital I/O operations.

As mentioned above, the host computer sends configuration information to an I/O module in order to customize the functionality of the I/O module. However, a fundamental problem associated with the prior art distributed I/O systems is that this configuration information programmed into an I/O module is lost when the I/O module is removed from its terminal base. The time and effort expended in tuning the I/O module's configuration is wasted. Thus, a need exists for a modular distributed I/O system with the capacity to more adequately maintain I/O module configuration even during the physical absence of the I/O module from its terminal base.

In addition to the physical removal of an I/O module, configuration information may be lost in response to the loss of power to the I/O module. Thus, it would be very desirable to provide a method for (a) capturing the configuration state of an I/O module, and (b) restoring the captured configuration state to the I/O module, or to another I/O module of similar type, after a power-loss event.

Another issue of concern in modular distributed I/O systems, and in networked systems in general, is to provide mechanisms for safely and reliably responding to failures in network bus communications. To this end, it is desirable to provide within each communication module an activity monitor for sensing communication failure conditions on the network bus. Furthermore, since the distributed I/O system is controlled by a software application which runs on the host computer, there may be a period of network bus inactivity during the initial start-up phase while the host computer loads the software application. It is desirable that the activity monitors within the communication modules not interpret this initial period of network bus activity as a communication failure condition.

The primary function of the communication module is to mediate communications between the network bus and the local bus formed by the adjoined terminal bases. In order to maximize the communication capacity over the local bus, it is necessary for the local bus architecture to be optimized. In particular, since an I/O module may be interchangably inserted into any terminal base, a need exists for an automatic mechanism of assigning addresses to terminal bases. Furthermore, since the I/O modules, in the course of their operation, may send and receive different types of data, a need exists for a partitioned local bus architecture where distinct sections of the local bus are dedicated for different types of data transfer.

In response to continuing improvements in CPU and memory technology, communication modules are increasingly able to perform more sophisticated types of processing under software control. In view of the fact that the module bank may include multiple I/O modules of different types, a need exists for a communication module with multi-threaded processing capacity, In order to perform the sensing and/or control tasks for which it is designed, an I/O module includes internal registers which may be read/written by the communication module as well as the I/O module. Thus, a mechanism for controlling read/write access to the internal registers is needed, and especially such a mechanism as would be compatible with the requirements of a communication module with multi-threaded processing capability.

SUMMARY

The problems and needs discussed above in the context of prior art modular distributed I/O systems are solved by the system and methods of the present invention. In particular, the present invention contemplates a method for maintaining the continuity of configuration information among multiple I/O modules which successively occupy a common slot (i.e. terminal base) in a distributed I/O system. The distributed I/O system includes a computer system coupled to at least one module bank. The module bank includes a communication module and one or more terminal bases which are in electrical contact with the communication module. The module bank also includes one or more I/O modules which are attached to corresponding terminal bases.

The method for maintaining configuration continuity includes the following steps. An I/O module is inserted into a terminal base of a module bank. The communication module reads configuration information stored in the I/O module. The stored configuration information comprises a data structure which serves to describe the functional characteristics and factory default settings for the I/O module. The communication module stores the configuration information in non-volatile memory as a "virtual module structure". Furthermore, the communication module monitors configuration updates which are supplied to the I/O module and updates the stored configuration information (i.e. virtual module structure) accordingly. The virtual module structure is maintained as a continuous image of at least a subset of the registers within the I/O module. When the I/O module is removed and a subsequent I/O module is inserted into the same slot (terminal base), the communication module determines if the subsequent I/O module is compatible with the stored configuration information. If the subsequent I/O module is determined to be compatible with the stored configuration information, the configuration information is used to configure the subsequent I/O module. Thus, configuration continuity is maintained between the first I/O module and the second I/O module.

It is noted that the communication module continues to update the stored configuration information after the first I/O module has been removed and before the subsequent I/O module has been inserted. In other words, the communication module detects messages targeted for the first I/O module even in the physical absence of the first I/O module, and updates the virtual module structure to correspond to the contents of the configuration registers of the first I/O module which would have prevailed if the first I/O module has not been removed.

The present invention further contemplates a method for providing a user-defined configuration state to a module bank where the module bank is comprised in an I/O system. The I/O system includes a computer and the module bank coupled by a network bus. The module bank comprises a communication module and one or more I/O modules coupled to the communication module. The method includes the following steps. First, the module bank is configured with a desired state. In the preferred embodiment of the invention, the desired state is established by a series of configuration messages sent by the computer to the communication module and the I/O modules which comprise the module bank. After the desired state of the module bank has been established, the computer sends a state capture command to the communication module in response to user input. The communication module captures the state of the communication module and the one or more I/O modules which comprise the module bank in response to the state capture commands. The captured state information is stored into non-volatile memory within the communication module. Then the captured state information is used to restore the state of the module bank in response to an event. In particular, the communication module configured the one or more I/O module with the captured state information in response to the event. In the preferred embodiment of the invention, the event is defined to be a loss of power to the module bank.

It is noted that the method also includes the step of configuring the communication module to perform the state restoration. Thus, the communication module performs the state restoration in response to the event only if the communication module has been pre-configured to do so.

The present invention also contemplates a method for providing delayed start-up of an activity monitor comprised with the distributed I/O system. As described above, the distributed I/O system includes a computer coupled to at least one module bank through a network bus. The module bank includes a communication module coupled to one or more I/O modules through a local bus. The method includes the following steps. The computer sends a monitor enable command to the communication module which enables the communication module to perform activity monitoring on network bus. However, the activity timer associated with the activity monitoring function is not actually started in response to the enable command. The activity timer is started when the communication module detects subsequent network traffic on the network bus, i.e. after having received the monitor enable command.

The communication module uses the activity timer to measure the time duration of period of network bus inactivity. When the communication module determines a period of inactivity which exceed a threshold after having started the activity timer, the communication module reads configuration values from memory, and writes the configuration values to the one or more I/O modules. The communication module assumes that a communication failure conditions exists on the network bus when the threshold-exceeding period of activity is determined. It is noted that this method of delaying start-up of the activity monitor allows a software application to be invoked or loaded into memory after the assertion of the monitor enable command. Since the software application typically generates the subsequent network traffic on the network bus, the method of the present invention prevents the intervening network bus inactivity from being interpreted as a communication failure condition.

Additionally, the present invention contemplates an I/O system with improved communication capabilities including a communication module, one or more I/O module, and a physical bus coupled between the communication module and each of the one or more I/O modules. The physical bus includes a parallel bus and a serial bus. The communication module is a master of the physical bus. Each of the one or more I/O modules includes memory. The memory of each I/O module is accessible to the communication module through the parallel bus. In addition, each of the I/O module includes non-volatile memory for storing a module information structure (MIS) which describes the corresponding I/O module. The communication module is operable to read the MIS of each of the I/O modules when the I/O module is coupled to the physical bus. The reading of the MIS is performed through the serial bus.

The system also includes one or more terminal bases which couple together to form the physical bus. The I/O modules are coupled to respective ones of the terminal bases. Each of the terminal bases includes a predecessor connector and a successor connector. The predecessor connector is adapted for coupling to a preceding terminal base or to the communication module, and the successor connector is adapted for coupling to a succeeding terminal base. The predecessor connector provides physical bus connectivity to the preceding terminal base, and the successor connector provides physical bus connectivity to the succeeding terminal base. The terminal bases are coupled together into a linear succession, and the predecessor connector of a first terminal base of the linear succession is coupled to the communication module.

According to the present invention, the physical bus includes an address assignment bus where the address assignment bus includes a plurality of address assignment lines. Each terminal base of the linear succession is operable: to receive an integer value asserted on the address assignment lines of its predecessor connector, to increment the integer value, and to assert the incremented integer value on the address assignment lines of its successor connector. Since the communication module asserts a fixed constant value on the address assignment lines coupling between said communication module and said first terminal base, each terminal base of the linear succession may be associated with a unique integer value based on physical proximity to the communication module. In the preferred embodiment of the invention, a terminal base uses the incremented integer value asserted on its successor connector as it assigned address. Any I/O module inserted into the terminal base inherits the address of its terminal base. It is noted that in an alternate embodiment of the invention, a terminal base uses the integer value receives on it predecessor connector as it assigned address.

The present invention further contemplates a method for controlling read/write access to the register space of an I/O module in a distributed I/O system. The distributed I/O system includes a computer system coupled to a module bank. The module bank includes a communication module coupled to one or more I/O modules. The method includes the following steps. A first process executing in the communication module requests access to the register space of an I/O module. The access request comprises initiating a read operation on a semaphore register associated with the I/O module. The I/O module determines if any process executing on the communication module already has access to the register space of the I/O module. The communication module grants register space access to the first process with information indicating whether any process previously executing in the communication module already has access to the register space of the I/O module. The first process may use the information to affect its register access behavior.

When the information indicates that a previous process already has access to the register space of the I/O module, the first process may force the previous process to release access by performing a semaphore release write operation to the I/O module. This strategy is preferred when the first process is known to be a high priority process relative to the previous process. When the first process is a lower priority process relative to the previous process, the first process may assume the strategy of waiting until the previous process releases access to the register space of the I/O module. In particular, the first process may repeatedly request access to the register space of the I/O module until the information indicates that no other process executing in the communication module currently controls access to the register space of I/O module.

In addition to the communication module, the I/O module itself may access the register space of the I/O module. Thus, the I/O module grants register space access to the communication module only when it does not currently control the register space. If a process requests access to the register space while the I/O module controls the register space, the I/O module will (a) deny the access request, and (b) store an indication of the access request asserted by the first process. When the I/O module subsequently releases the register space, the I/O module will be unable to regain access to the register space until a process executing on the communication module has requested, gained, and released access to the register space of the I/O module.

In order to provide an informed determinism to the access control mechanism, the I/O module is configured to store a semaphore request time parameter which specifies the maximum time duration the I/O module control access to the register space after a request for access has been asserted by the communication module. The communication module reads the semaphore request time parameter from the I/O module preferably when the I/O module is inserted into the module bank. Thus, a process which requests access to the register space of an I/O module and is denied may optimally determine the times of subsequent access requests. For example, a "least effort" strategy dictates that having been denied an access request, a process should perform a subsequent access request after the semaphore request time elapses, since the I/O module will have released access to the register space within this time.

BRIEF DESCRIPTION OF THE DRAWINGS

A better understanding of the present invention can be obtained when the following detailed description of the preferred embodiment is considered in conjunction with the following drawings, in which:

FIG. 12 is a table of the physical signal lines included in the local bus of the present invention;

FIG. 16, collectively comprising FIGS. 16A and 16B, illustrates the organization of the module information structure (MIS) according to the present invention;

FIG. 18A illustrate the Snap Shot Capture and Enables feature according to the present invention;

Figure 1A:
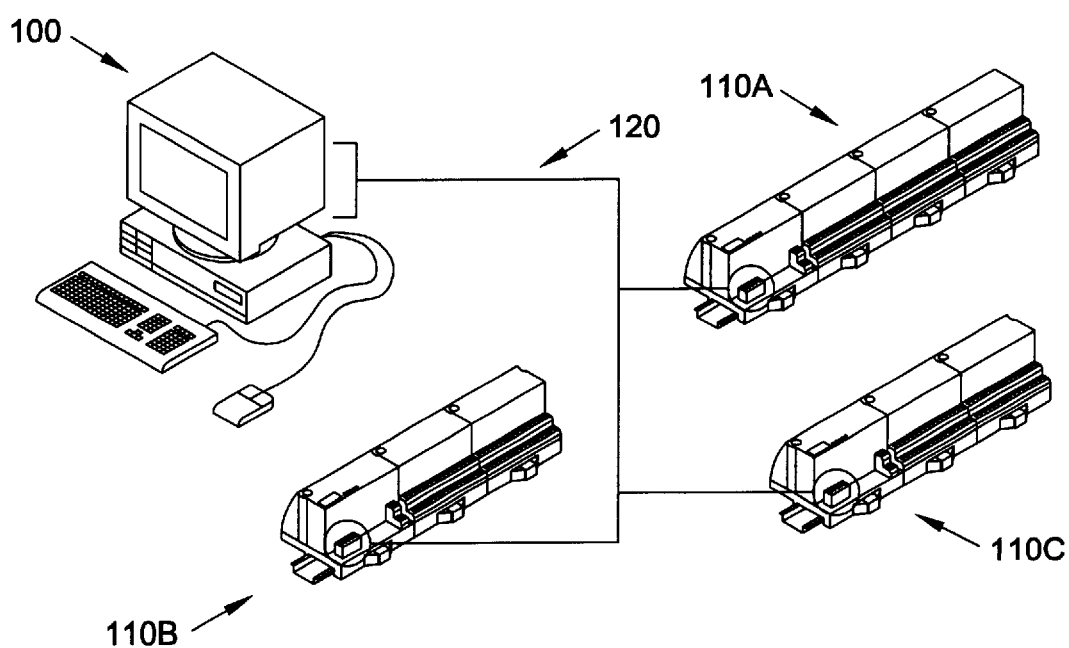
FIG. 1A illustrates a first embodiment of the modular distributed I/O system of the present invention.

While the invention is susceptible to various modifications and alternative forms specific embodiments are shown by way of example in the drawings and will herein be described in detail. It should be understood however, that drawings and detailed descriptions thereto are not intended to limit the invention to the particular form disclosed. But on the contrary the invention is to cover all modifications, equivalents and alternatives following within the spirit and scope of the present invention as defined by the appended claims.

DETAILED DESCRIPTION OF THE PRESENT INVENTION

FIG. 1A illustrates a first embodiment of the modular distributed I/O system of the present invention. The modular distributed I/O (MDIO) system comprises a computer 100, and a plurality of module banks 110 for performing field distributed I/O operations. The MDIO system can include up to 25 module banks 110. FIG. 1A depicts three module banks labelled 110A through 110C. The computer 100 is coupled to the I/O module banks 110 through a network bus 120. In this first embodiment, the network bus 120 preferably comprises an RS-485 serial bus.

In the present embodiment, the total cable distance between the computer 100 and all module banks 110A to 110C can be up to 4000 feet (nominal).

Figure 1B:
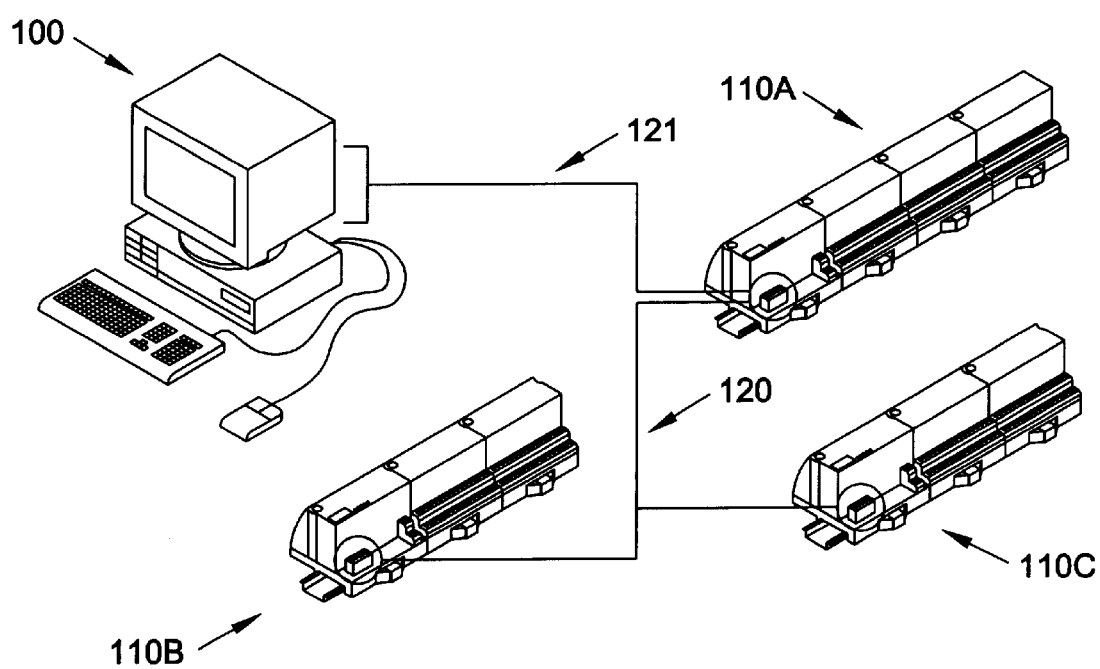
FIG. 1B illustrates a second embodiment of the modular distributed I/O system of the present invention.

FIG. 1B illustrates a second embodiment of the modular distributed I/O system of the present invention. As with the first embodiment, the second embodiment includes computer 100 and module banks 110. However, in the second embodiment, network bus 120 is reserved for coupling the I/O modules 210 together, while a short range bus is employed to couple computer 100 with the first module bank 110. The short range bus preferably comprises an RS232 bus.

Figure 2:
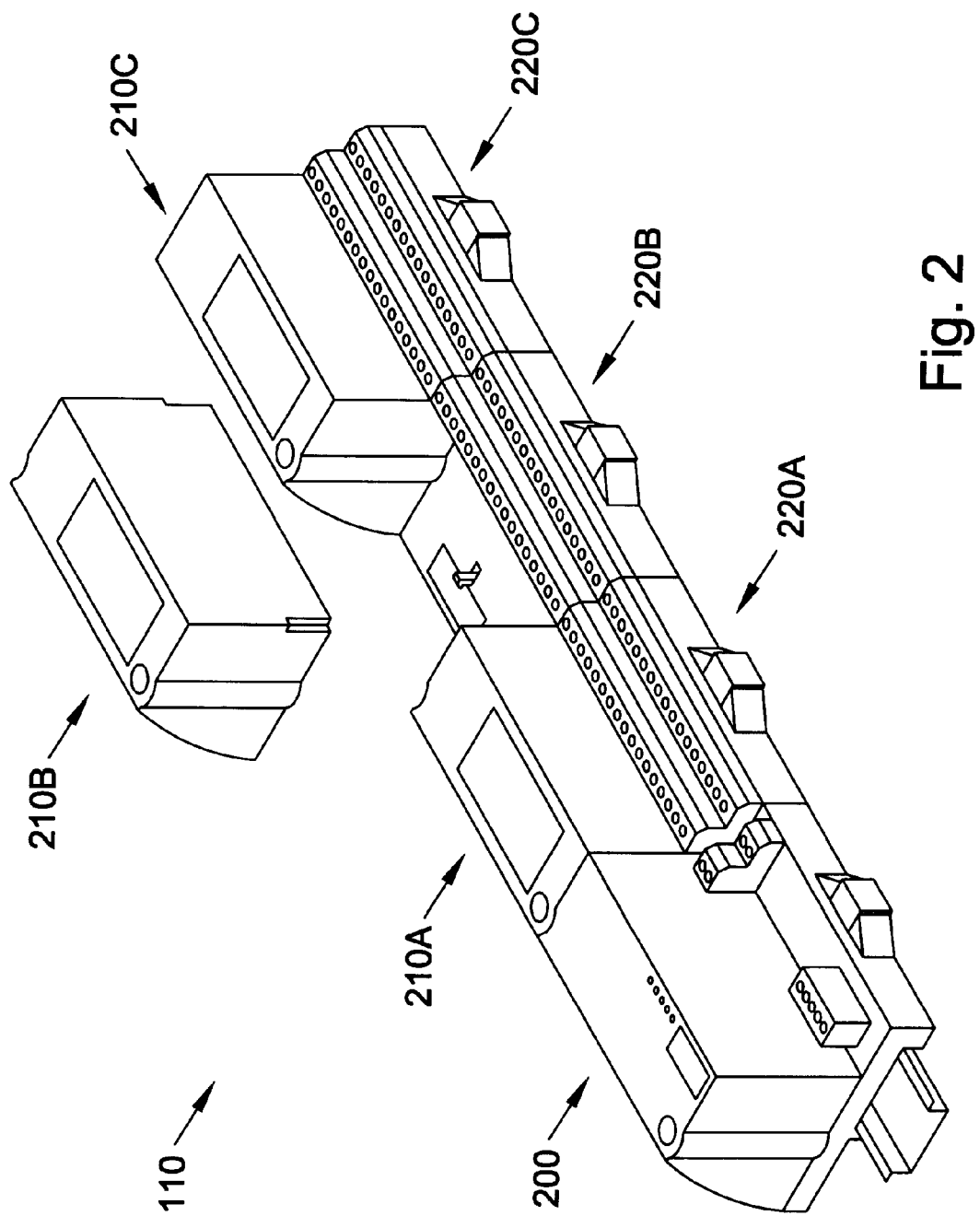
FIG. 2 illustrates a typical module bank 110 according to the present invention.

FIG. 2 illustrates a typical module bank 110 according to the present invention. The module bank 110 includes a network module 200 and a plurality of I/O modules 210. FIG. 2 depicts three I/O modules labelled 210A through 210C. The I/O modules 210 are configured to perform basic I/O operations such as analog current measurement, analog current sourcing, thermocouple temperature measurement, discrete input sensing, discrete output signal generation, and so forth. The I/O modules 210 are inserted into terminal bases 220 as indicated by the exploded view of I/O module 210B and terminal base 220 B. FIG. 2 depicts three terminal bases 220A, 220B, and 220C.

The I/O modules 210 and terminal bases 220 are physically universal in the sense that any I/O module 210 can be inserted into any terminal base 220, provided a keying mechanism on the terminal base 220 is set to the universal position. Alternatively, the keying mechanism on a terminal base 220 may be set so that the terminal base 220 accepts only a certain type of I/O module 210. Each terminal base 220 includes a host of convenient external connectors for wiring to field devices. When an I/O module 210 is inserted into a terminal base 220, the I/O module 210 is electrically coupled to the external connectors of the terminal base 220. As the terminal bases 220 are coupled together and coupled to the network module 200, altogether they form a high-speed local bus that efficiently transfers data between the I/O modules 210 and the network module 200. The module bank 110 can include up to nine I/O modules 210.

Figure 3A:
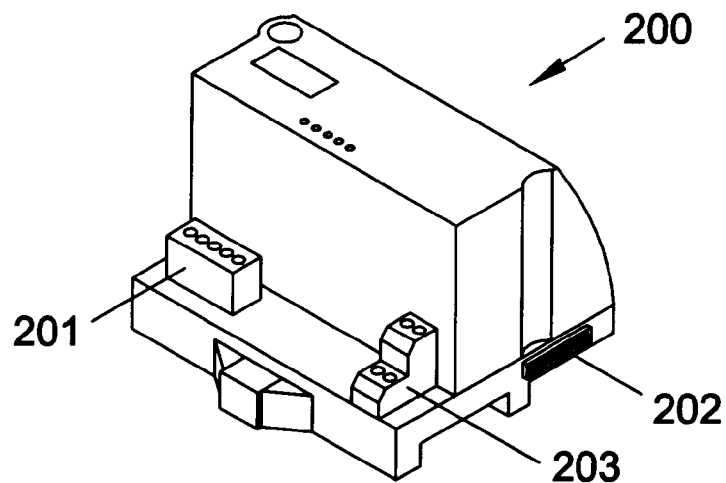
FIG. 3A illustrates network module 200 in isolation from the module bank 110.

FIG. 3A illustrates network module 200 in isolation from the module bank 110. The network module 200 includes a network bus connector 201 for coupling to the network bus 120, and a local bus connector 202 for communication with I/O modules 210. The network module 200 mediates communications between computer 100 and the I/O modules 210. Thus, the network module 200 is also referred to as a communication module. In addition, the network module 200 receives external power through power connector 203, and supplies power to the I/O modules 210 through the local bus which includes lines for power and ground. Since each network module 200 typically has its own power source, each module bank 110 may be operated independently. In a typical scenario, one module bank may be powered down for re-wiring of field devices, while the remaining module banks are powered and fully operational.

Figure 3B:
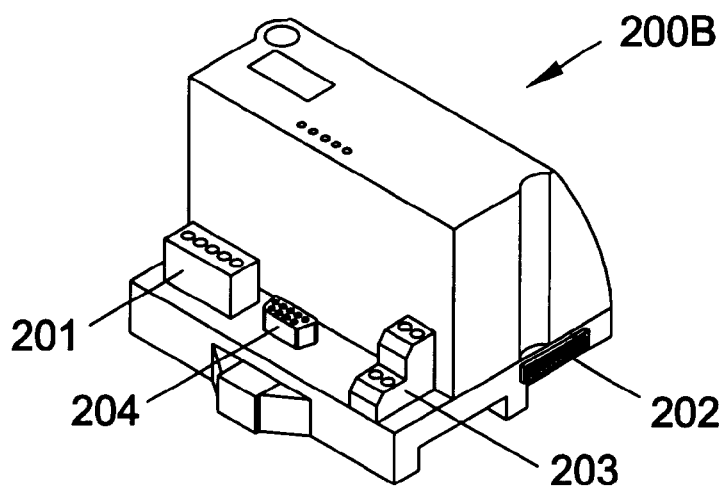
FIG. 3B illustrates an alternate embodiment of network module 200 herein referred to as network module 200B.

FIG. 3B illustrates an alternate embodiment of network module 200 herein referred to as network module 200B. In addition to network bus connector 201, local bus connector 202, and power connector 203, network module 200B includes a short range bus connector 204. Network module 200B is employed in the first module bank 110A of the second embodiment illustrated in FIG. 1B. The remaining module banks 110 in FIG. 1B employ network module 200 described above. In particular, the short range bus connector 204 of module 200B couples directly to the short range bus 121 to achieve connectivity with computer 100. Furthermore, the network bus connector 201 of network module 200B couples to network bus 120, thereby achieving connectivity to the remaining network modules 200. The network modules 200 of the remaining module banks, e.g. 110B and 110C, couple to the network bus 120 through their respective network bus connectors 201.

Network module 200B includes a bi-directional repeater to forward signals from short range bus 121 to network bus 120, and vice versa. The bi-directional repeater advantageously allows computer 100 to employ a low power device to drive short range bus 121.

Figure 4C:
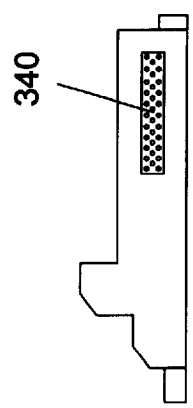
FIG. 4C provides a right side view of the terminal base 220.
Figure 4A:
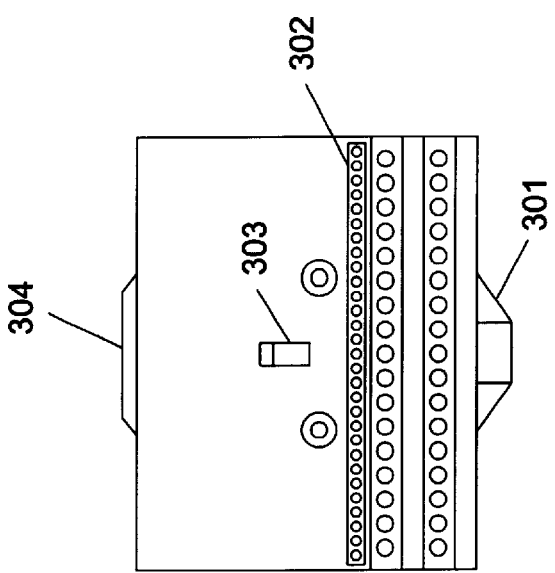
FIG. 4A provides a top view of an isolated terminal base 220.

FIG. 4A provides a top view of an isolated terminal base 220. The terminal base 220 includes a DIN Rail Clip 301. With the DIN rail clip 301 in its unlocked position, the terminal base 220 may be mounted onto a standard DIN rail (see FIG. 5). As long as the DIN Rail clip 301 is in the unlocked position, the terminal base 220 may freely slide along the DIN rail. However, when the DIN rail clip is set to its locked position, the terminal base 220 is bound securely to the DIN rail.

The terminal base 220 also includes a module access connector 302, a latch 303, and ejector button 304. Each I/O module 210 has a slot for receiving latch 303 and a connector which is complementary to the module access connector 302. When an I/O module 210 is properly aligned with the terminal base 220, the I/O module 210 is seated into the terminal base 220 by the application of pressure. Once an I/O module 210 is seated into a terminal base 220, the module access connector 302 provides the I/O module 220 with access to the local bus, and to the external connectors (see FIG. 4D) of the terminal base 320.

Figure 4B:
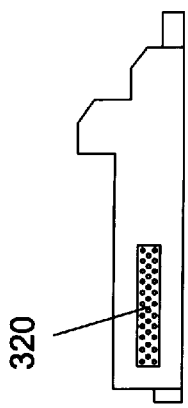
FIG. 4B provides a left side view of the terminal base 220.

FIG. 4B provides a left side view of the terminal base 220. In this view it is apparent that the terminal base 220 includes a left local bus connector 320. The left local bus connector 320 is also referred to as a predecessor connector 320.

FIG. 4C provides a right side view of the terminal base 220. In this view it is apparent that the terminal base 220 includes a right local bus connector 340. The right local bus connector 340 is also referred to as a successor connector 340. The right local bus connector 340 and the left local bus connector are complementary. Thus, the right local bus connector 340 of one terminal base naturally couples with the left local bus connector 320 of a second terminal base as implied by the terminal bases 220A and 220B of FIG. 5.

Figure 4D:
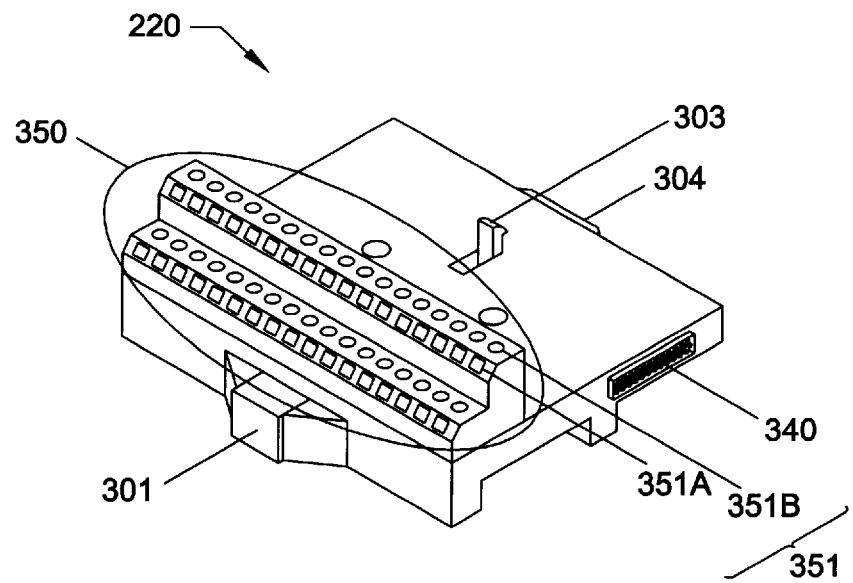
FIG. 4D provides a perspective view of terminal base 220.

FIG. 4D provides a perspective view of terminal base 220. In this view it is apparent that the terminal base 220 is supplied with an external connector bank 350 which comprises two rows of external connectors for wiring to field devices. Each external connector includes a slot for admitting an external wire and a screw for securing the wire to the slot. For example, external connector 351 includes slot 351A and corresponding screw 351B. An external wire is inserted in slot 351A, and fastened to the slot by tightening screw 351B. In an alternative embodiment of the terminal base 220, the screws of the external connectors 350 are replaced with spring loaded locking devices. In this case, if the screw 351B is reinterpreted as a spring loaded locking device 351B, one depresses the spring loaded locking device 351B in order to allow admission of a wire into the corresponding slot 351A. Once a wire is inserted into the slot 351A, it is locked into position within the slot simply by releasing pressure from the spring loaded locking device 351A.

When an I/O module 210 is seated into the terminal base 220, the I/O module 210 is electrically coupled to the external connectors of the external connector bank 350. As described above, this coupling occurs through module access connector 302.

Figure 5:
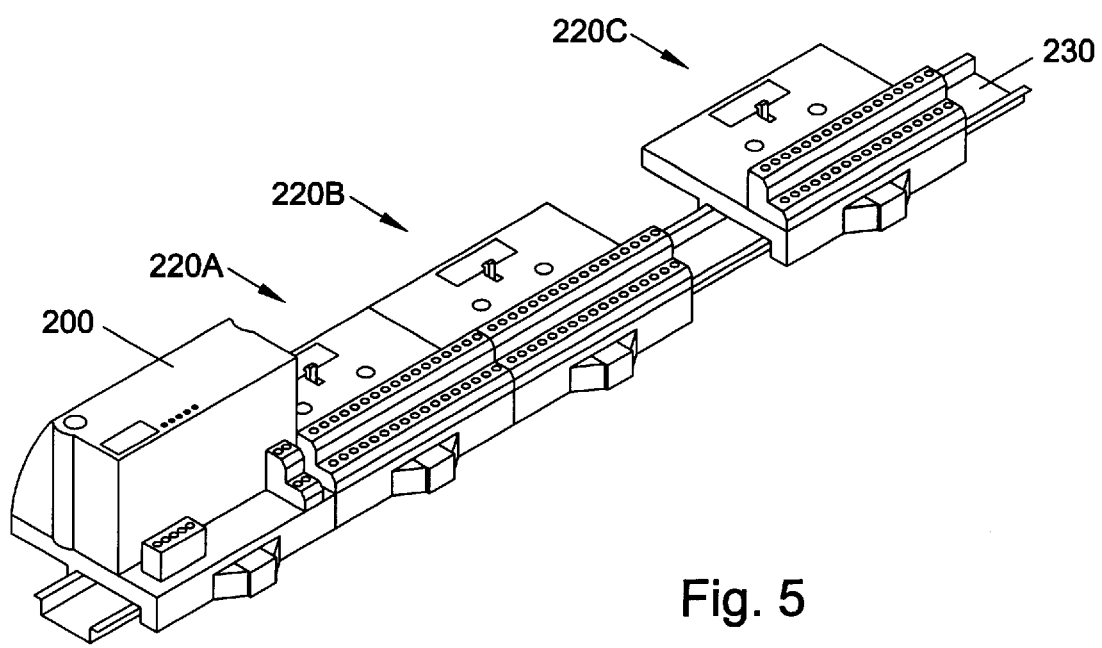
FIG. 5 illustrates network module 200 and several terminal bases 220 according to the present invention mounted onto a DIN Rail 230.

FIG. 5 illustrates network module 200 and several terminal bases 220 mounted onto a DIN Rail 230. The network module 200 and terminal bases 220A and 220B are shown coupled to each other, while terminal base 220C is shown uncoupled. With the DIN rail clip of terminal base 220C in its unlocked position, a user may slide terminal base 220C until its left local bus connector 320 securely interfaces with the right local bus connector 340 of terminal base 220B. Then the terminal base 220C is locked into position by closing the DIN rail clip 301 of terminal base 220C. The steps just described for connecting one terminal base 220 to another also serve to describe the means for connecting a first terminal base 220 to the network module 200.

As mentioned above, the high-speed local bus (not shown) is formed as the terminal bases 220 are coupled to each other and to network module 200. Each terminal base 220 contains internally a portion of the local bus. As additional terminal bases 220 are connected to the existing complex of connected terminal bases, the local bus automatically extends. I/O modules 210 connect to the local bus through the terminal bases 220.

Figure 6:
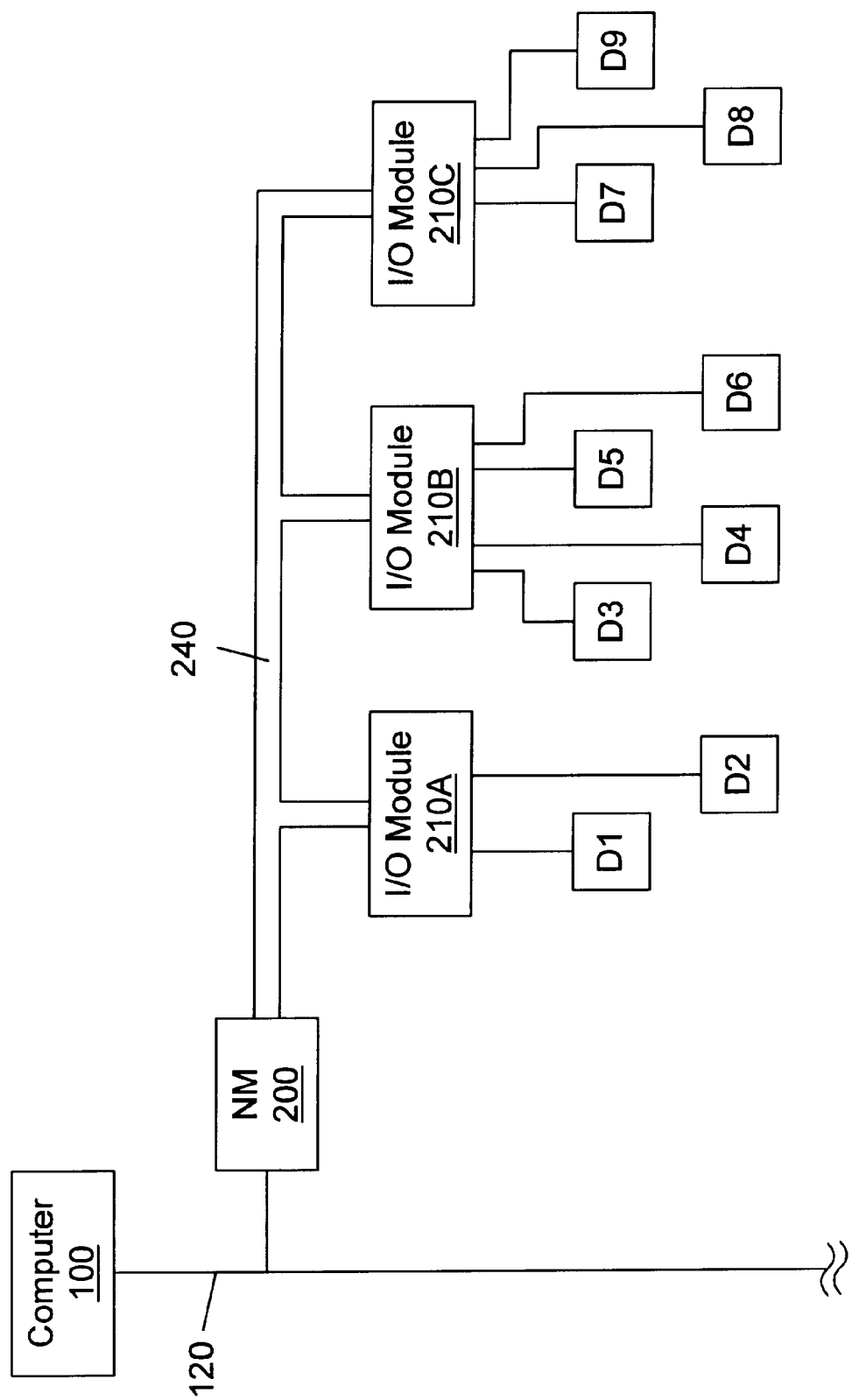
FIG. 6 is an abstracted block diagram of the modular distributed I/O system according to the present invention showing the patterns of connectivity within and surrounding a typical module bank 110.

FIG. 6 is an abstracted block diagram of the modular distributed I/O system showing the patterns of connectivity within and surrounding a typical module bank 110. The terminal bases 220 are not shown in order to more clearly exhibit the local bus. The network module 200 is coupled to computer 100 through the network bus 120. The I/O modules 210 and network module 200 are connected by local bus 240. As mentioned above, local bus 240 is formed as the terminal bases 220 (not shown in FIG. 6) are coupled together. Each I/O module 210 is coupled to the local bus 240 through the terminal base 220 in which it is seated. It is noted that certain portions of local bus 240 contain active elements which are resident in the terminal bases 220, i.e. local bus 240 is not entirely comprised of pure conductors. The architecture of local bus 240 will be explained in detail below.

Furthermore, as mentioned above, each I/O module 210 is coupled to the external connectors 350 of the terminal base 220 in which it is seated. Through these external connectors 350 each I/O module 210 connects to one or more external I/O devices $D_k$. The maximum number of I/O devices $D_k$ to which an I/O module 210 may connect is determined by the type of the I/O module 210. For example, an 8-channel analog input module has eight input channels for sensing signals from up to eight devices $D_k$. The types of I/O modules 210 which are available for use in the preferred embodiment are described more fully below. FIG. 6 shows nine I/O devices $D_1$ through $D_9$ partitioned among three I/O modules 210A, 210B, and 210C.

Since the network module 200 couples directly to the network bus 120, and the I/O modules 210 couple to the network module 200 through the local bus 240, the network module 200 represents the module bank 110 from the point of view of the serial bus 120 and computer 100.

Figure 7:
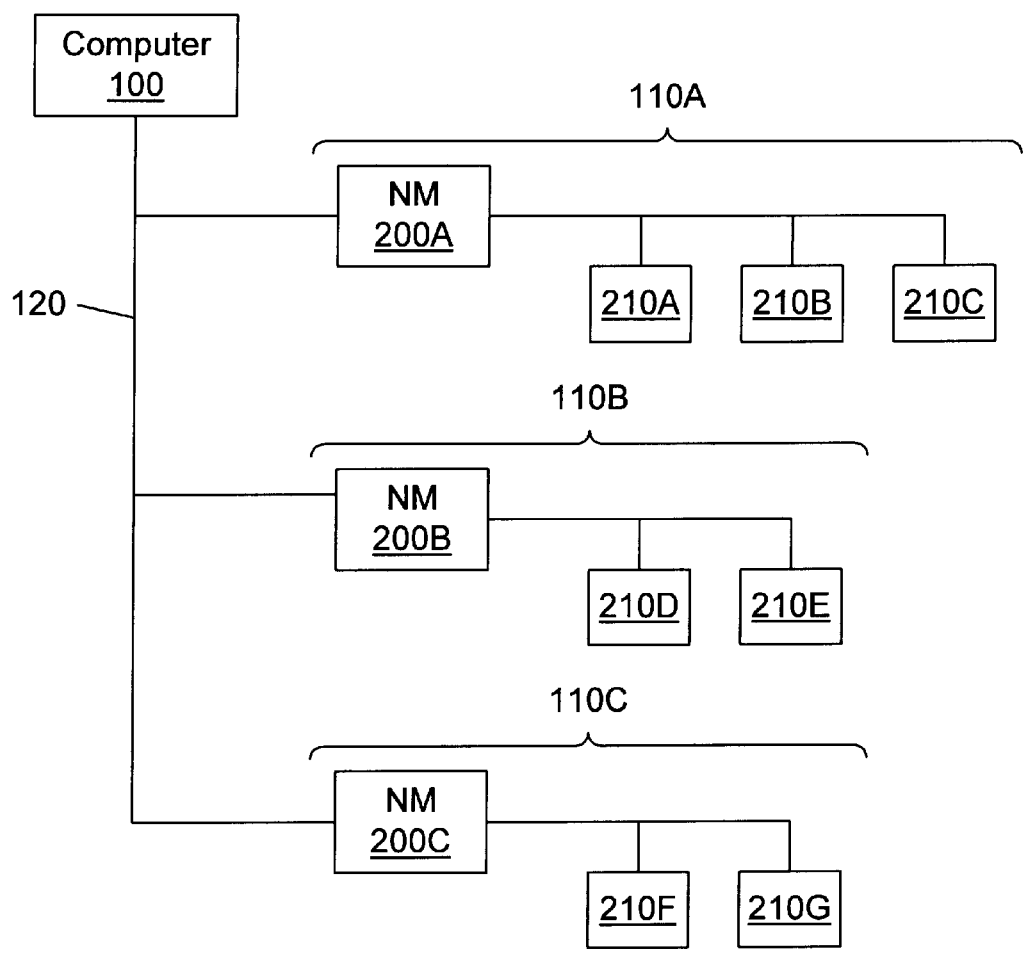
FIG. 7 is an abstracted block diagram of the MDIO system of FIG. 1A according to the present invention.

FIG. 7 is an abstracted block diagram of the MDIO system of FIG. 1A. Again, the terminal bases 220 are not shown to more clearly exhibit local bus connectivity. Furthermore, the coupling of I/O modules 210 to external I/O devices $D_k$ is not shown for the sake of simplicity. As described above, each module bank 110 comprises a network module 200 and up to nine I/O modules 210. In FIG. 7, the I/O modules 210A through 210G are partitioned among the three network modules 200A through 200C as shown. Each network module 200 includes an array of DIP switches which determine (a) the address of the network module 200 as seen by the computer 100 via the network bus 120, and (b) the baud rate at which the network module 200 is to communicate over the network bus 120 with computer 100. The system user sets the DIP switches of each network module 200 so that each network module 200 has a unique serial bus address, and a common baud rate.

Software running on computer 100 provides a system user with an interface for controlling and monitoring the state of the MDIO system. In response to user requests, computer 100 sends messages to selected network modules 200 and/or selected I/O modules 210. Messages targeted for an I/O module 210 are routed through a corresponding network module 200. Thus, each network module 200 mediates network communication for a whole module bank.

I/O Module Functionality

The I/O Modules 210 occur in a variety of different types. Each type of I/O Module performs a set of I/O related functions. By choosing among the different types of I/O modules, a system user has the flexibility to customize the I/O capabilities of each module bank 110 and of the MDIO system as a whole. The following table lists several different types of I/O Modules 210 which are available for use in the MDIO system.

| Module Type | Channels | Description | Signal Ranges |
|---|---|---|---|
| AI-8 | 8 | analog inputs | mV, V, 0–20 mA, 4–20 mA |
| AO-8 | 8 | analog outputs | 0–20 mA, 4–20 mA |
| DI-16 | 16 | discrete inputs | 24 VDC |
| UDI-8 | 8 | universal discrete inputs | 5 to 240 VAC/VDC |
| DO-8 | 8 | discrete outputs | 24 VDC (10 to 30 VDC) |
| DO-16 | 16 | discrete outputs | 24 VDC (10 to 30 VDC) |

Analog Input Module

An analog input I/O module (AI-8) has eight input channels for monitoring analog input signals. Each input channel can be independently configured to accept either a voltage or current input signal. Furthermore, each input channel has a noise filter which can be independently configured to reject either 50 Hz, 60 Hz, or 500 Hz. When all the channels are configured for 50 Hz or 60 Hz rejection, the input channels are sampled every 1.48 second or 1.24 seconds respectively. When all the channels are configured for 500 Hz rejection, the input channels are sampled every 0.18 seconds.

Input signals are digitized using a high-accuracy, 16-bit resolution A/D converter, which is continuously and automatically calibrated using a stable voltage reference and calibration circuitry within the AI-8 module.

The AI-8 module has over-ranging and under-ranging capability. For example, when configured for an input range of 4–20 mA, the AI-8 module actually measures inputs from 3.5 to 21 mA. Thus, the AI-8 module is able to tolerate input devices and sensors which may not be accurately calibrated.

Figure 8:
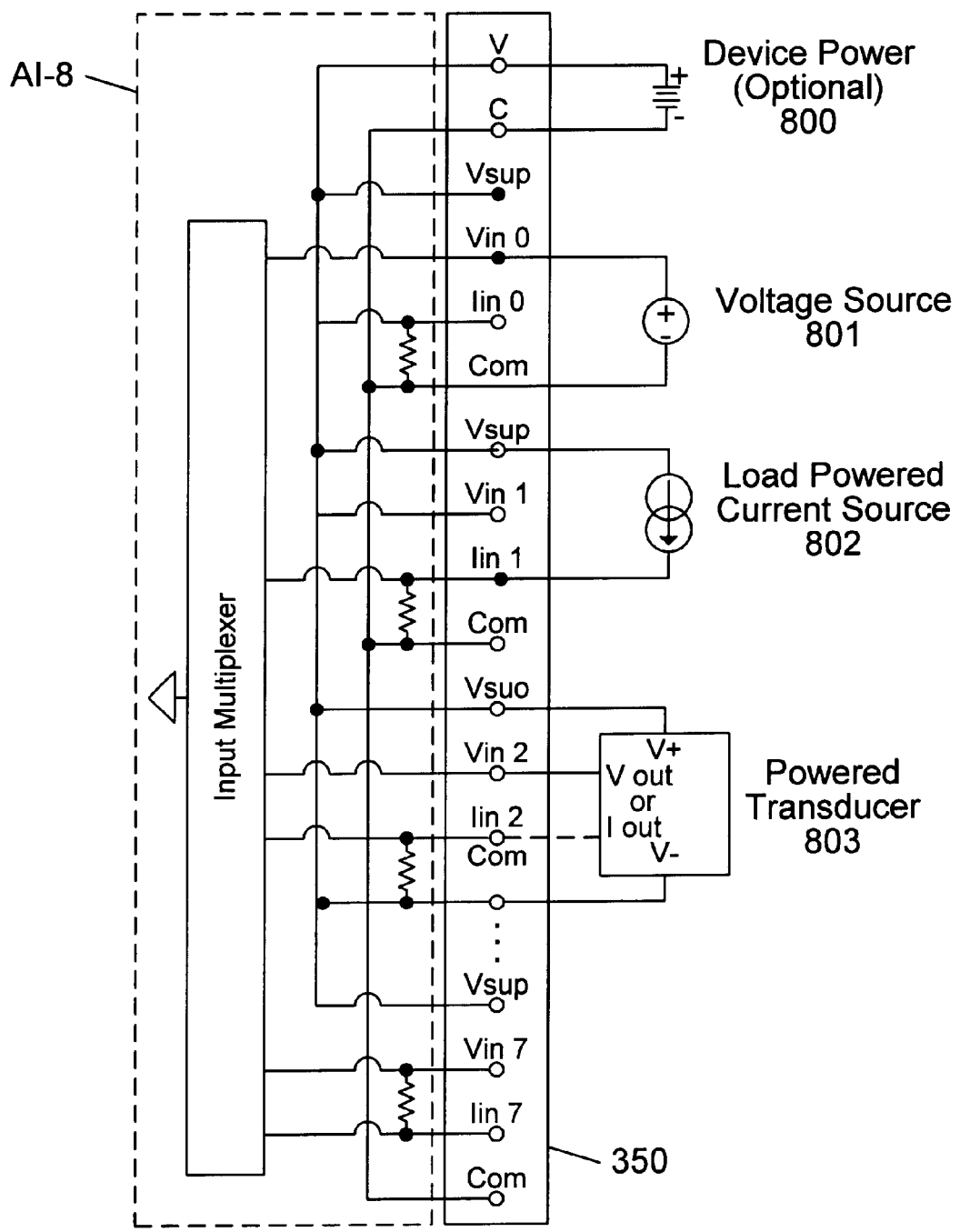
FIG. 8 presents a wiring diagram for an 8 channel analog input module.

FIG. 8 presents a wiring diagram for the AI-8 module. The AI-8 module mounts onto a terminal base 220 (not shown), and thus is in electrical contact with terminals of the external connector block 350 of the terminal base 220. Field devices are wired to the terminals of the external connector block 350. Each input channel of the AI-8 module is provided with four input terminals: voltage input (Vin), current input (Iin), common (Com), and optional power (Vsup) for field devices. If necessary, the user can connect a power supply 800 for field devices to the V and C terminals of the external connector block 350. The AI-8 module routes the V and C terminals to the Vsup and Com terminals of each channel. External field devices may be generally modeled as either a voltage source 801, a loop powered current source 802, or a powered transducer 803. In FIG. 8, the voltage source 801 is applied to input channel zero. The nominally positive and negative sides of voltage source 801 are coupled respectively to the terminals Vin0 and Com of input channel zero. A loop powered current source 802 is shown coupled to input channel one. The loop powered current source 802 is coupled to the Vsup and Iin1 terminals of input channel one as shown. The powered transducer 802 is coupled to input channel two. The powered transducer 802 includes V+ and V− terminals which are coupled to the Vsup and Com terminals of input channel two. Furthermore, the Vout terminal of the powered transducer 802 is coupled to the terminal Vin2 of input channel two. Optionally, the powered transducer 802 has a current out (Iout) terminal which is coupled to the terminal Iin2 of input channel two.

The input channels zero through seven are supplied to an input multiplexer 804. The remaining functional blocks of the AI-8 module are not shown for the sake of simplicity of the illustration.

Analog Output Module

An analog output module (AO-8) has eight analog output channels for sourcing current to external devices. Each output channel can be independently configured to operate with an output range of either 0–20 mA or 4–20 mA. The output signals are generated with a 12-bit D/A converter. With built-in overanging capability, the actual full-scale output ranges are 0–21 mA and 3.5–21 mA. Thus, the AO-8 module is able to compensate for span and offset errors in uncalibrated field devices which load the output channels. The AO-8 module sources current provided by an external loop supply from 5–24 VDC.

Each output channel includes a monitoring circuit and LED indicator for open current loop detection. An open circuit on any channel or faulty loop power supply lights the corresponding LED. This error condition can also be reported to the network module 200 and computer 100.

Figure 9:
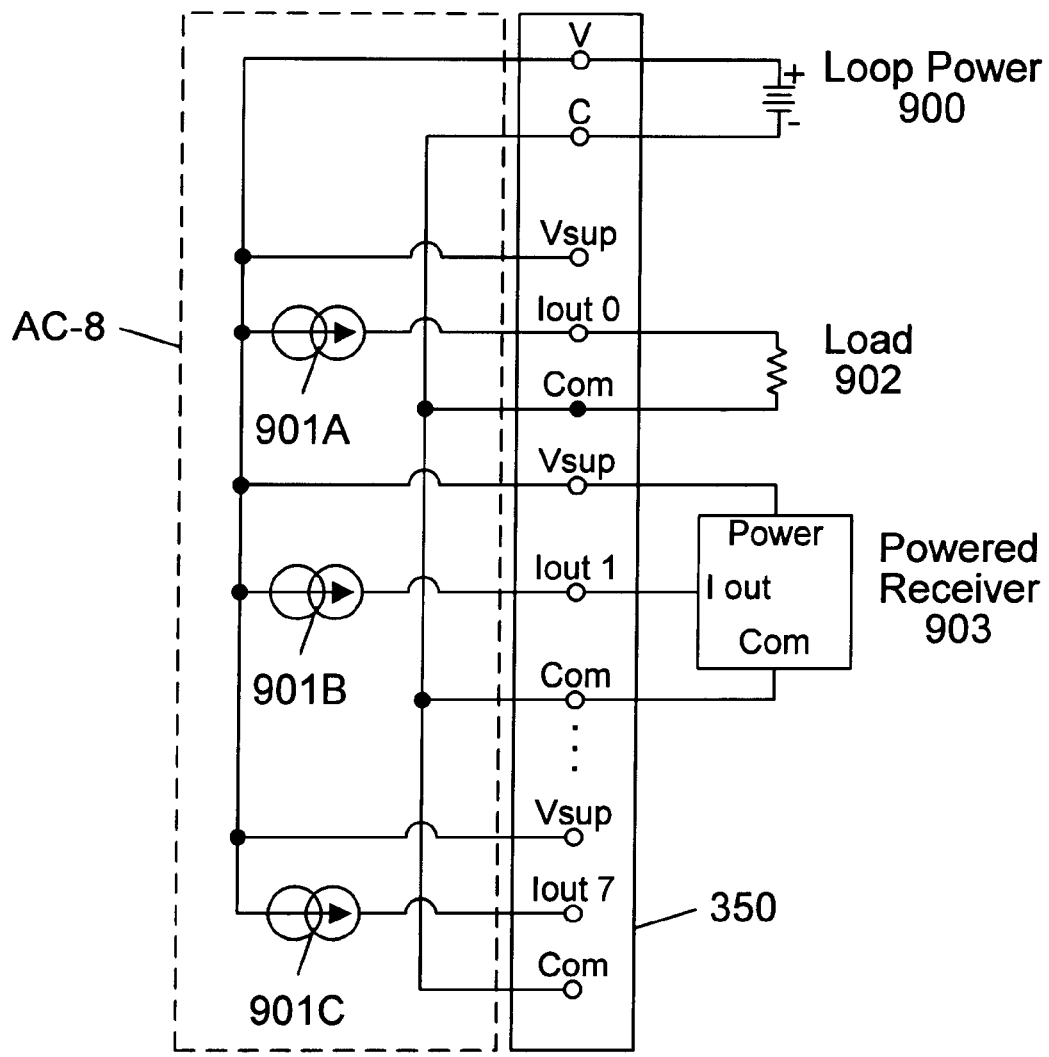
FIG. 9 presents a wiring diagram for an 8 channel analog output module.

FIG. 9 is a wiring diagram of the AO-8 module. The AO-8 module mounts onto a terminal base 220 (not shown), and thus is in electrical contact with terminals of the external connector block 350 of the terminal base 220. Field devices are wired to the terminals of the external connector block 350. Each output channel of the AO-8 is provided with a current source 901. Thus, the AO-8 module includes eight current sources 901A through 901H. In FIG. 9, current sources 901C through 901G are implicitly suggested by the ellipses. The current sources 901 are power by an external power supply 900 which is coupled to the V and C terminals of the external connector block 350. As mentioned above, the external power supply 900 may have any voltage in the range from 5 to 24 VDC.

Each output channel of the AO-8 module has three output terminals: current output (Iout), current common (COM), and loop power (Vsup). The AO-8 module internally routes the V and C terminals to the Vsup and Com terminals respectively for each of the output channels. An external field device may be generally modeled either as a load 902 or a powered receiver 903. A load 902 is shown coupled to output channel zero. The terminals of the load 902 are coupled to the terminals Iout0 and Corn of output channel zero. A powered receiver 903 is shown coupled to output channel one. The power receiver 903 includes Power and Corn terminals which are coupled to the Vsup and Com terminals respectively of output channel one. Furthermore, the Iin terminal of the powered receiver 903 is coupled to the terminal Iout1 of output channel one.

Discrete Input Module

A 16-channel discrete input module (DI-16) provides sensing for up to sixteen 24 VDC input devices such as DC proximity and limit switch outputs, push-button switches, and thermostat states.

Figure 10:
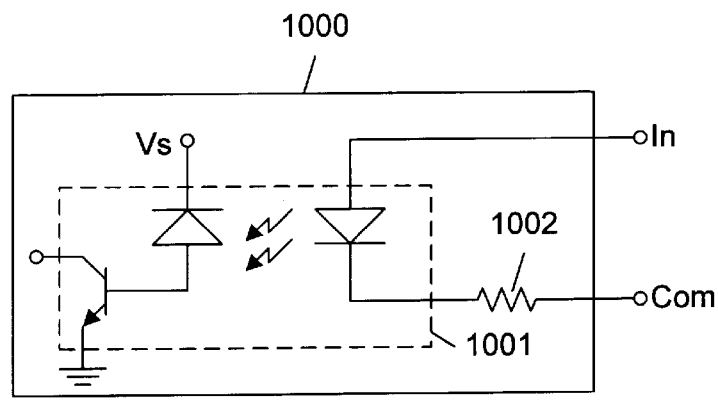
FIG. 10 illustrates an input isolation circuit for a 16 channel discrete input module.

Each input channel of the DI-16 module includes an input circuit 1000 as shown in FIG. 10. The input circuit 1000 comprises an opto-isolator 1001 in series with current limiting device 1002. The input circuit 1000 senses a logical ON state when the signal supplied to terminal IN is greater than or equal to 15 VDC with respect to the Com terminal. Conversely, the input circuit 1000 senses a logical OFF state when the input signal at terminal IN is less than or equal to 5 VDC with respect to the Com terminal. The input circuit 1000 provides 3000 Vrms of breakdown isolation. In addition, the DI-16 provides double insulation for up to 250 Vrms of operational isolation.

8-Channel Universal Discrete Input Module

A universal discrete input module (UDI-8) has eight input channels for sensing the discrete (i.e. ON/OFF) state of up to eight externally supplied signals. Each input channel may be driven by a wide range of signal types, from digital logic signals to 240 VAC/VDC signals. For example, the UDI-8 module can be used to sense the state of TTL signals, proximity and limit switches, push-button switches, thermostats, relays, or power circuits.

Figure 11:
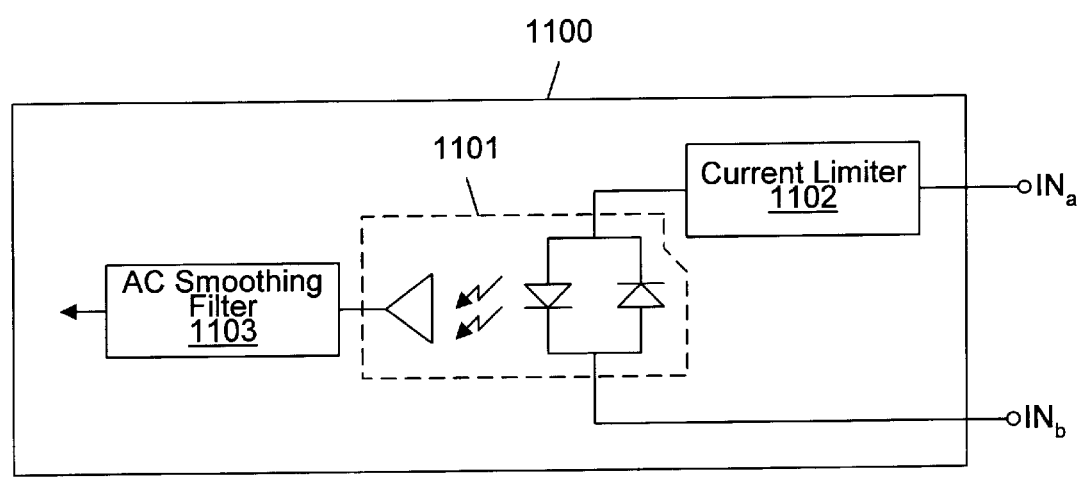
FIG. 11 illustrates an input isolation circuit for an 8 channel universal discrete input module.

Each input channel of the UDI-8 module includes an input isolation circuit 1100 as shown in FIG. 11. The input isolation circuit 1100 includes a bi-directional opto-isolator 1101 in series with a current limiter 1102. A voltage signal to be sensed is provided across terminals INa and INb of the input channel. The combination of the bi-directional opto-isolator 1100 and the current limiter 1101 allows the input isolation circuit 1100 to sense a wide range of AD and DC input voltages. The input isolation circuit 1100 also includes an AC smoothing filter 1103 to provide for stable detection of AC signals.

The connections INa and INb can be used as an isolated two-wire input, or one of the connections can be wired to an external common (or supply) terminal for use with sourcing (or sinking) discrete devices. A positive or negative DC input signal with a magnitude greater than 4 volts, up to 240 volts, will turn on the opto-isolater circuit 1101 and register as a logic high. When sensing the presence of AC signals, a 50 Hz or 60 Hz sinusoidal signal with a magnitude of at least 15 VAC registers as a constant logic high. The UDI-8 module returns a constant logic low as long as the peak magnitude of the signal does not exceed ±1 volt.

Discrete Output Modules

The DO-8 and DO-16 modules are discrete output modules. The DO-8 module provides eight discrete output channels, while the DO-16 provides sixteen discrete output channels. Both modules can drive a total of 8A, or up to 2A on any single channel. The outputs are compatible with voltages from 10 to 30 VDC. Each channel includes an LED to indicate the on/off state of the output.

Local Bus Architecture

The local bus 240 provides a physical medium for communication within an I/O module bank 110. The network module 200 is a local bus master. The local bus comprises physical lines signal lines as listed in the physical interface table of FIG. 12. The direction of the signals is given as seen by the network module. The physical lines of the local bus 240 are defined as follows.

BA[3:0] The Base Address Lines BA[3:0] are used in the present invention to assign addresses to each of the terminal bases 220 according to proximity to the network module 200. This address assignment mechanism will be explained in detail below.

MD[3:0] The Module Select Lines MD[3:0] are used by the network module 200 to address a particular I/O module 210 for communication access.

CH[3:0] The Channel Select Lines CH[3:0] are used by the network module 200 to address a particular logical channel within the I/O module 210 addressed by lines MD[3:0].

WR* The low-going Write Line WR* is asserted by the network module 200 to start a write cycle.

RD* The low-going Read Line RD* is asserted by the network module 200 to start a read cycle.

FC[2:0] The Function Code Lines FC[2:0] are asserted by the network module 200, and determine a function which is to be performed in a read or write access. The following table describes the function associated with each value of the Function Code. It is noted that the interpretation of a Function Code generally depends on the kind of access being performed (i.e. read or write access).

| Function Code | FC2 | FC1 | FC0 | Read access | Write access |
|---|---|---|---|---|---|
| 0 | 0 | 0 | 0 | Semaphore Request | Command Write |
| 1 | 0 | 0 | 1 | Status Read | Semaphore Release |
| 2 | 0 | 1 | 0 | Configuration Read | Configuration Write |
| 3 | 0 | 1 | 1 | Data Read | Data Write |
| 4–7 | 1 | x | x | Reserved | Reserved |

D[7:0] The Data Lines D[7:0] are used to convey data to/from an I/O module 210 during (a) data register reads or writes (Function Code 3), (b) configuration register reads or writes (Function Code 2), (c) status register reads (Function Code 1), (d) semaphore request reads (Function Code 0), (d) command register writes (Function Code 0), or (e) semaphore release writes (Function Code 1).

CLK The network module 200 provides a clock signal to the I/O module 210 through the Clock Line CLK. The clock signal is nominally 4 MHz. States may change on the rising edge of this clock but must be valid by the falling edge.

SPI_CS* The Serial Chip Select Line SPI_CS* is a serial interface line for setting the Start sequence which opens a serial communication channel to a I/O module 210.

MOSI The MOSI (Master Out Slave In) Line is used for sending serial data from the network module 200 to an I/O module 210.

MISO The MISO (Master In Slave Out) Line is used for sending data from an I/O module 210 to the network module 200.

SPI_CLK The Serial Clock SPI_CLK Line carries a clock signal for the serial interface. The clock rate of the Serial Clock signal is less than 1 MHz.

NEW_MD* The New Module Interrupt Line NEW_MD* is used to indicate that one or more new I/O modules 210 have been inserted into terminal bases and have not yet been configured. In other words, when a new I/O module 210 is inserted into a terminal base 220, the new I/O module 210 drives the NEW_MD* line low. The network module 200 is thereby informed of the existence of new I/O modules 210.

RESET* The Master Reset Line RESET*, when asserted by the network module 200, causes all I/O modules 210 to be reset.

GND The network module 200 and all I/O modules 210 are tied to a common ground through the GND line.

+5V The network module 200 supplies all the I/O modules 210 with power (1 Watt) through the +5V Line.

Figure 13:
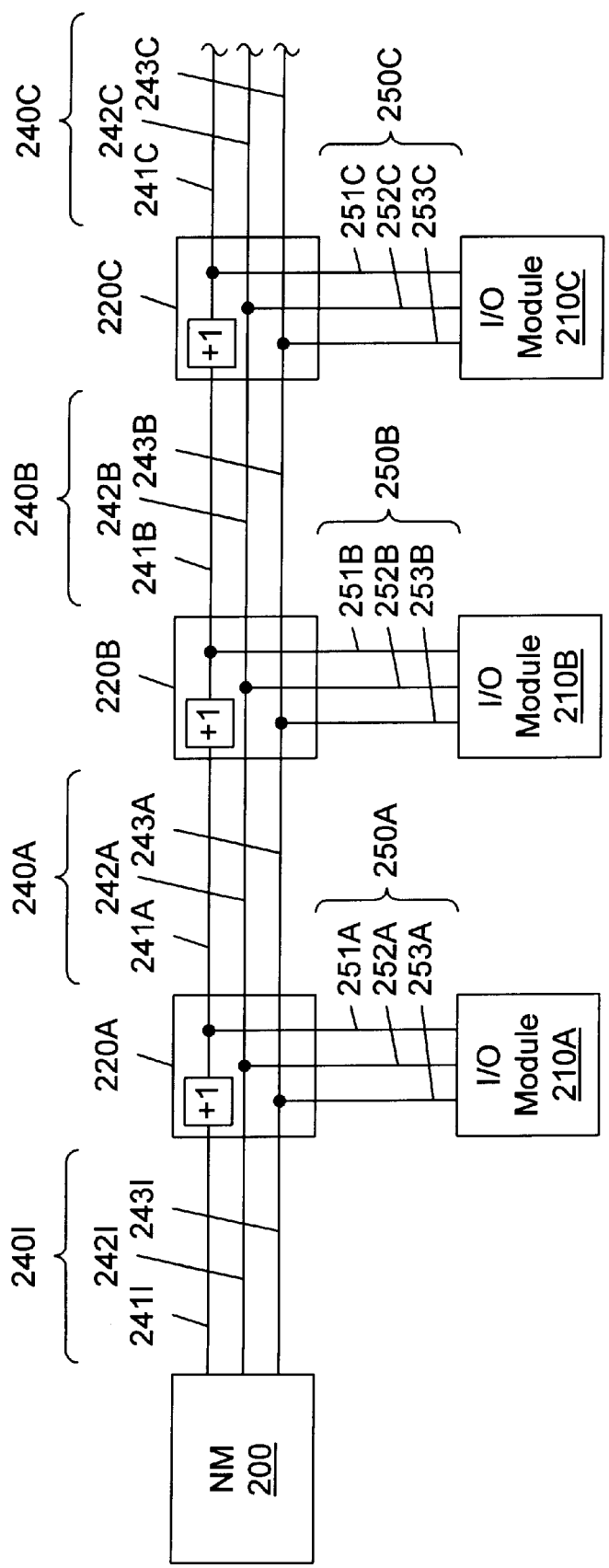
FIG. 13 is an abstracted diagram of the local bus architecture for an I/O module bank 110 according to the present invention.

FIG. 13 is an abstracted diagram of the local bus architecture for an I/O module bank 110. As indicated in FIG. 5, the local bus connector 202 of network module 200 is directly coupled to the left local bus connector 320 of terminal base 220A, thereby achieving the connectivity indicated by local bus portion 240I. The right local bus connector 340 of terminal base 220A is directly coupled to the left local bus connector 320 of terminal base 220B, thereby achieving the connectivity indicated by local bus portion 240A. The right local bus connector 340 of terminal base 220B is directly coupled to the left local bus connector 320 of terminal base 220C, thereby achieving the connectivity indicated by local bus portion 240B. Similarly, terminal base 220C optionally couples to a successive terminal base 220 through local bus portion 240C.

Terminal base 220A is coupled to I/O module 210 A through local bus portion 250A. In physical realization, local bus portion 250A comprises part of the connectivity achieved by module access connector 302. It is noted that module access connector 302 also provides the I/O module 210A with connectivity (not shown) to the external connector bank 350 of terminal block 220A. Similarly, terminal base 220B is coupled to I/O module 210B through local bus portion 250B, and terminal base 220C is coupled to I/O module 210C through local bus portion 250C.

The local bus 240 is partitioned into three sub-categories: the address assignment bus 241, the parallel bus 242, and the serial bus 243. The address assignment bus 241 corresponds to base address lines BA[3:0] in the physical interface table above. The address assignment bus 241 is physically subdivided into sections 241I, 241A, 241B, and 241C between each of the terminal bases 220, or between the network module 200 and the first terminal base 220A. The parallel bus 242 corresponds to lines #5–26, and lines #31–33 of the physical interface table above. The parallel bus 242 is associated with sections 242I, 242A, 242B, and 242C. However, since each terminal base 220 directly couples the parallel bus section from its left local bus connector 320 to its right local bus connector 340, in a configured module bank 110 all sections 242I, 242A, 242B, and 242C of the parallel bus 242 are coupled together electrically. Furthermore, each of the terminal bases 220A, 220B, and 220C provide access to the parallel bus 242 for I/O modules 210A, 210B, and 210C respectively through sections 252A, 252B, and 252C respectively.

The serial bus 243 corresponds to lines #27–30 from the table above, and is associated with sections 243I, 243A, 243B, and 243C. Again, since each terminal base 220 directly couples the serial bus section from its left local bus connector 320 to its right local bus connector 340, all sections 243I, 243A, 243B, and 243C are coupled together electrically. Furthermore, each of the terminal bases 220A, 220B, and 220C provide access to the serial bus 243 through sections 253A, 253B, and 253C for I/O modules 210A, 210B, and 210C respectively.

The partitioning of local bus 240 into sub-categories optimally corresponds to the types of data transfer tasks that must occur in a module bank. The address assignment bus 241 is dedicated for assigning an address to each of the I/O modules 210 of the module bank. The serial bus 243 is dedicated for low priority and/or non-time critical tasks such as the task of reading the module information structure (MIS) of I/O modules 210. In contrast, the parallel bus 242 is configured to handle high priority and/or time-critical transfer tasks such as read/write accesses to the register spaces of I/O modules. As a consequence of the local bus partitioning, when a new I/O module 210 is inserted into a terminal base 220, the MIS of the I/O module 210 may be read through the serial bus 243 without slowing down or impeding normal transfer operations to pre-existing I/O modules 210 through the parallel bus 242.

Address Assignment Mechanism

The address assignment bus 241 is used to assign an address to each terminal base 220 in an I/O module bank 110. The address assignment mechanism of the present invention is geographical. Thus, the terminal base 220 which is closest to the network module 200 is always assigned the base address one (0001), and the remaining terminal bases 220 which are successively farther removed from the network module 200 are assigned successively larger base addresses. An I/O module 210 inherits the address of the terminal base 220 in which it is mounted. For example, the terminal bases 220A, 220B, and 220C in FIG. 2 would be assigned the addresses one, two and three respectively. Thus, I/O modules 210A, 210B, and 210C inherit the addresses of their terminal bases, i.e. one, two and three respectively.

The address assignment mechanism of the present invention operates as follows. The network module 200 perpetually asserts zero (all bits zero) on the base address lines BA[3:0] which comprise address assignment bus section 241I. Each terminal base 220 reads the address assignment bus section at its left local bus connector 320, adds one to this 4-bit integer value, and asserts the incremented 4-bit value on the address assignment bus section at it right local bus connector 320. Thus, for example, terminal base 220A reads the integer value 0000 from the address assignment bus section 240I, adds one, and asserts the result, 0001, on address assignment bus section 241A. By extrapolation of this method, it follows that address assignment bus sections 241B and 241C will maintain values 0010 and 0011 respectively. Thereby, each terminal base 220 maintains an integer value which reflects its position in the coupled succession of the terminal bases 220 with the network module 220 representing the head of the succession. By definition, the incremented integer value as calculated by a terminal base 220, and as asserted on the address assignment section at its right local bus connector 340, is taken to be the address of the terminal base 220. So terminal bases 220A, 220B, and 220C have addresses one, two, and three respectively.

I/O module 220A inherits the address of terminal base 220A, since the incremented address assignment value (which defines the terminal base address) is provided to the I/O module 220A through address assignment bus section 251A. The lines BA[3:0] comprising address assignment bus section 251 A carry the integer value 0001B which defines the address of the I/O module 220A. Similarly, I/O module 210B and 210C are provided with the addresses of their corresponding terminal bases through address assignment bus sections 251B and 251C respectively.

In the preferred embodiment of the invention, the terminal bases 220 use combinational logic to increment the integer address assignment value.

Since addresses are associated with physical proximity to the network module, a system user is able to easily locate a faulty I/O module 210: e.g. address three means physically the third terminal base 220. Furthermore, the faulty I/O module 210 can be replaced with a new I/O module 210 of the same type [or with a new I/O module 210 of a type which comprises a fimctional superset of the type to be replaced], and the new I/O module 210 will instantaneously assume the proximity address of the terminal base 220 of its predecessor (i.e. the faulty I/O module 210 ).

Generic Architecture of I/O Modules

Although the I/O modules 210 occur in a number of different types, the local bus interface to each of the I/O module types has a common structure. Each I/O module type has a predetermined number of logical (i.e. addressable) channels. It is to be noted that the number of logical channels does not necessarily agree with the number of physical channels for an I/O module type, since the mapping between logical channels and physical channel is not necessarily one-to-one.

Each logical channel of an I/O module 210 has a data register, a configuration register, and a command register. In addition, the I/O module 210 includes a status register of which the 6 most significant bits report the global status of the I/O module 210, and of which the 2 least significant bits report channel specific information. The data and configuration registers admit read and write access. However the command register is write-only, and the status register is read-only.

Each data register has an associated number of data points. One or more data points map to a single physical channel. Some examples of the correspondence between logical channels, points, and physical channels are as follows.

1. An analog output module AO-8 has 8 physical output channels, and 8 logical channels of one point each. Thus, each logical channel corresponds to a physical channel.
2. A discrete input module DI-16 has 16 physical input channels, and 1 logical channel with 16 points. Thus, each physical channel corresponds to two points of the logical channel.
3. A counter module CT-8A has 8 physical channels, and 8 logical channels with two points each. Thus each logical channel correspond to a physical channel. One point of a logical channel defines a count value, and the second point defines an input frequency for the corresponding physical channel.
4. An counter module CT-8B has 8 physical channels, and 16 logical channels with 1 point each. Eight logical channels define the count values for the eight physical channels, while the eight remaining logical channels define input frequencies for the eight physical channels.
5. A waveform output module WAV-4 has 4 physical, channels, and four logical channels with 1024 points each. The 1024 points of a logical channel define amplitude values for the waveform to be asserted on one physical channel.

Each data register is organized as a circular buffer. Reads or writes to a data register are accomplished by addressing an I/O module 210 and a particular logical channel in the I/O module 210 with the Function Code set to 3. Each byte of the channel's data register may be read (or written) with consecutive I/O read (or write) cycles. Since these reads (or writes) increment a byte pointer associated with the data register, all of a channel's data bytes must be read (or written), thus rolling over the pointer to the head of the data register, before attempting to access another channel's data register. It is advisable to follow a data register read with a status register read on the same channel to verify that the data was valid, the I/O module still exists, the I/O module is configured, etc.

While the network module 200 possesses the semaphore of an I/O module 210, it may freely access (read and/or write) the channels of the I/O module 210. It is noted that the I/O module 210 does not update its data registers while the network module 200 holds the semaphore. Thus, by not releasing the semaphore the network module 200 is able to ensure that data read from different channels was acquired close together in time.

Configuration Registers

A logical channel may be individually configured by writing to its configuration register. A configuration register includes storage for a Range ID and one or more Attribute Settings as illustrated by the following table.

| Byte 0 | Byte 1 | Byte . . . | Byte n |
|---|---|---|---|
| Range ID | Attribute 0 setting ID | Attribute . . . setting ID | Attribute n − 1 setting ID |

A configuration register is written (or read) one byte at a time. The value of the Range ID determines the range which is force for the logical channel. For example, the range "4–20 mA" has a Range ID of 1. The Attributes may be programmable (more than one possible Attribute Setting ID) or predetermined (only one possible Attribute Setting ID).

In order to facilitate automatic configuration of I/O modules 210, each I/O module 210 includes non-volatile memory which stores a Module Information Structure (MIS). The MIS provides a description of the structure and programmable states of the I/O module 210. All I/O modules 210 of a particular type have identical MISes. When an I/O module 210 is initially inserted into a terminal base 220, the network module 200 reads the MIS of the I/O module 210.

Each MIS contains one or more Channel Information Structures. A Channel Information Structure (CIS) defines the characteristics of an abstract channel type which can be applied to one or more logical channels. Each logical channel conforms to one of the Channel Information Structures of the MIS. Among other things, a Channel Information Structure includes (a) a number of points associated with the present channel type, (b) a number of ranges supported by the present channel type, (c) a description for each range supported by the present channel type [including Range ID, and Data Length for points associated with the present range], (d) a number of Attributes associated with the current channel type, (e) a description of the possible Settings ID's for each of the Attributes associated with the current channel type.

Command Registers

In addition to a configuration register, each channel of an I/O module 210 has a command register space (possibly of null length). To issue a command, the network module 200 writes to the I/O module 210 with Function Code set to 0. The values of the Data lines D[7:0] are written into the addressed command register space. Examples of commands include Start/Stop Counter, Reset Module, Clear Latches, and Start Averaging. The command register space is written to one byte at a time. The number of commands and the depth of the command register space is determined by the information in the channel's Channel Information Structure (CIS).

Module Select, Channel Select, and Function Code Lines

The module select lines MD[3:0], Channel Select lines CS[3:0], and Function Code lines FC[2:0] are asserted by a bus master (e.g. the network module 200 ) in addressing I/O modules 210. The module select lines MD[3:0] are used to address a particular I/O module 210. Each I/O module 210 compares its assigned address inherited from its terminal base to the module select lines MD[3:0]. If a match occurs, the bus master is granted access to read or write from/to the I/O module 210.

The Channel Select lines CS[3:0] address a particular logical channel within the addressed I/O module 210. The Function Code lines FC[2:0] are used (1) to access a particular register space within the addressed logical channel of the addressed I/O module; or (2) to request a semaphore from an I/O module 210; or (3) to release a semaphore back to an I/O module 210. The table below specifies the meaning of each value of the Function Code. Note that the interpretation of a Function Code depends on whether a read or write access is being performed.

| Function Code | FC2 | FC1 | FC0 | Read access | Write access |
|---|---|---|---|---|---|
| 0 | 0 | 0 | 0 | Semaphore Request | Command Write |
| 1 | 0 | 0 | 1 | Status Read | Semaphore Release |
| 2 | 0 | 1 | 0 | Configuration Read | Configuration Write |
| 3 | 0 | 1 | 1 | Data Read | Data Write (if applicable) |
| 4–7 | 1 | x | x | Reserved | Reserved |

Writing to an I/O Module

A falling edge on the WR* line starts a write cycle on the local bus 240. The Module Select lines MS[3:0], Channel Select lines CS[3:0], and Function Code lines FC[2:0] must be stable before the falling edge on the WR* line. The WR* line must remain low as long as the RDY line is low. Data must remain valid on the data line D[7:0] until the rising edge of the WR* line. Successive writes to the same logical channel of an I/O module 210 will write to successive bytes of that channel's data (or configuration) register. Reading from an I/O Module A falling edge on the RD* line starts a read cycle on local bus 240. The Module Select lines MS[3:0], Channel Select lines CS[3:0], and Function Code lines FC[2:0] must be stable before the falling edge of the pulse. The RD* line should remain low as long as the RDY line is low. Data will remain valid on the data lines D[7:0] until the rising edge of the RD* line. Successive reads of the same logical channel of an I/O channel will read successive bytes of that channel's data (or configuration) register.

Semaphore Mechanism

In order to control access to the data and configuration registers of the I/O modules 210, the present invention employs a semaphore mechanism. One semaphore is associated with each I/O module 210. The network module 200 must possess the semaphore before accessing the data register and/or configuration register of the corresponding I/O module 210. To obtain the semaphore of an I/O module 210, the network module 200 reads the I/O module 210 with the Function Code 0. This act of reading the I/O module 210 with Function Code 0 comprises a semaphore request, i.e. a request for possession of the semaphore. In response to the semaphore request, the I/O module 210 either: (a) grants the semaphore to the network module 200 with an indication that the current granting is non-trivial, i.e. that prior to the current granting, the network module 210 did not already have possession of the semaphore; (b) acknowledges that the semaphore was already possessed by the network module 200 prior to the current request, and remains in the possession of the network module 200; or (c) denies the semaphore request. Each I/O module 210 includes a semaphore register which includes a pair of semaphore status bits S_Gnt* and S_Ack. The I/O module 210 updates the semaphore status bits before the RD* line is deasserted by the network module 200 during the semaphore request read cycle. The updated condition of the semaphore status bits reflects one of the responses (a), (b), or (c) according to the following semaphore status table.

| Response to Semaphore Request | S_Gnt* | S_Ack |
|---|---|---|
| (a) I/O module grants semaphore request non-trivially, i.e. the network module 200 did not already own it. | 0 | 1 |
| (b) I/O module grants semaphore request trivially, i.e. the network module 200 already possessed the semaphore. | 1 | 1 |
| (c) I/O module denies semaphore request: semaphore not granted. | 1 | 0 |

The network module 200 examines the contents of the semaphore register accessed by the semaphore request. The condition of the semaphore status bits informs the network module 200 if the semaphore has been granted, and if so, whether the semaphore is being newly granted or was already possessed by the network module 200.

When the network module 200 has ownership of a semaphore, the network module 200 may freely access (read and/or write) the data registers and/or configuration registers of the corresponding I/O module 210. When the network module 200 is finished accessing the I/O module 210, the network module releases the semaphore to the I/O module 210 by writing the I/O module 210 with Function Code set to 1. A semaphore request subsequent to the semaphore release will receive response (a) unless the I/O module 210 seizes the semaphore in the time intervening between the semaphore release and the subsequent semaphore request. In this later case, the subsequent semaphore request will receive the response (c), i.e. semaphore not granted.

The qualification of the semaphore grant offered by the S_Gnt* bit is important for the embodiment where the network module 200 is capable of multiprocessing. Suppose that a first process running in network module 200 performs a semaphore request and is granted the semaphore of an I/O module 210. Furthermore, suppose that the first process gets context-switched out and a second process gets switched in. If the second process performs a semaphore request to the same I/O module 210, the second process will receive response (b), i.e. semaphore granted but already possessed, since the first process still possesses the semaphore. In this case, the second process may take the passive approach of waiting until the first process is finished accessing the I/O module 210 and releases the semaphore. To this end, the second process may intermittently perform semaphore requests. Response (b) will prevail until the first process releases the semaphore, after which time the response (a) will be detected.

Alternatively, if the second process is time-critical (or has a high priority relative to the first process), the second process may assert a semaphore release and thereby force the first process to relinquish the semaphore. A subsequent semaphore request asserted by the second process will result in response (a), i.e. a non-trivial granting of the semaphore. Thus, the qualified semaphore grant mechanism and the semaphore release feature of the present invention allow time-critical processes to maintain their determinism. Without the semaphore release feature, a time-critical task would be forced to wait for an indefinite length of time for the first process to finish its data transfer activity and release the semaphore voluntarily.

It is noted that it is possible for the I/O module 210 to seize the semaphore in the time interval between the semaphore release and the subsequent semaphore request asserted by the second process, in which case the subsequent request will be denied, i.e. receive response (c). Thus, it is advantageous to minimize the time interval between the semaphore release and the subsequent request.

Semaphore Request Storing Feature

The semaphore mechanism of the present invention has a feature that elevates the priority of a semaphore request from the network module 200. This guarantees faster semaphore granting, and also eliminates the case of accidental request synchronization. Accidental request synchronization is said to occur if the request cycle times of the I/O module 210 and the network module 200 are such that each time the network module 200 requests the semaphore, the I/O module 210 has possession of it. Such a condition would make it impossible for the network module 200 to gain ownership of the semaphore.

If the I/O module 210 owns the semaphore and cannot grant it in response to the request from the network module 200, the I/O module 210 stores the request. The stored request prevents the I/O module from re-owning the semaphore once it releases it. This feature guarantees that once the I/O module relinquishes the semaphore, the ownership of the semaphore is reserved for the network module 200 (i.e. the I/O module 210 cannot re-acquire the semaphore unless the network module 200 releases it). This also implies that the network module 200 must either re-attempt to acquire a semaphore that it was not granted, or must indicate that it no longer needs the semaphore by performing a semaphore release. Releasing a semaphore that was not granted causes the latched request to be invalidated.

Deterministic Semaphore Availability

In order to provide determinism to the semaphore mechanism, the semaphore control algorithm of the I/O module 210 enforces a maximum time the I/O module 210 may own the semaphore after a denied semaphore request. As explained above, if a network module 200 asserts a semaphore request while the I/O module 210 owns the semaphore, the I/O module 210 denies the semaphore request, i.e. the semaphore request receives response (c). The semaphore control algorithm allows the I/O module 210 to retain the semaphore no longer than the maximum time after the denied semaphore request. The maximum time is referred to as the semaphore request time.

The semaphore request time is stored in the Module Information Structure (MIS) of the I/O module in non-volatile memory. All modules of a given type have the same semaphore request time. When an I/O module 210 is initially inserted into an active terminal base, the network module 200 reads the MIS of the I/O module 210 and is thereby informed of the semaphore request time of the I/O module. A first process executing in network module 200, after having received response (c) to a first semaphore request, may use the semaphore request time to determine an optimal strategy for performing subsequent semaphore requests. For example, according to a "least effort" strategy, the first process asserts a second semaphore request after the semaphore request time elapses starting from the first semaphore request. Since the I/O module 210 is guaranteed to release the semaphore within the semaphore request time following the first semaphore request, the second semaphore request will be non-trivially granted, i.e. receive response (a). It is noted that it is possible for another process running in the network module 200 to request the semaphore in the time interval intervening between the semaphore release by the I/O module 210 and the second semaphore request by the first process. In this case, the second semaphore request will be trivially granted, i.e. receive response (b).

According to a "east time" strategy, the first process asserts repeated semaphore requests after the first semaphore request and before the semaphore request time elapses. Since, the I/O module 210 may release the semaphore before the semaphore request time elapses, e.g. due to a natural completion of a data transfer task, the process by following the least-time strategy may obtain semaphore ownership sooner than if the least effort strategy were followed.

Processes executing in the network module 200 may be more efficiently coded in view of the fact that all I/O modules 210 have deterministic behavior. Furthermore, a given process may employ an optimized semaphore request strategy for each of the I/O modules 210 which takes into account: the function performed by the I/O module 210; the semaphore request time of the I/O module 210; the priority of the process relative to other processes running the network module 200; etc.

Semaphore State Diagram

Figure 14:
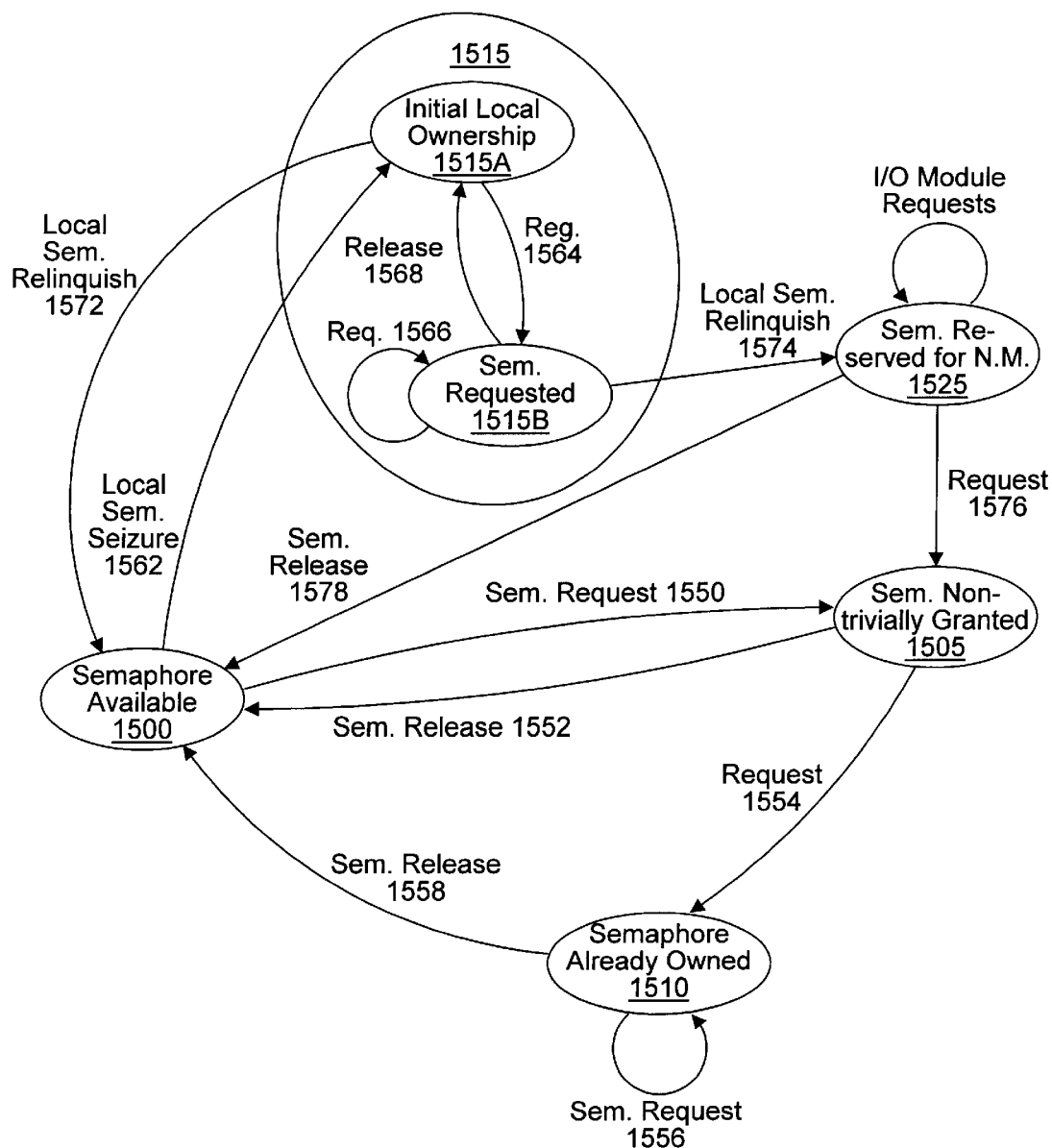
FIG. 14 is a state diagram of the semaphore mechanism of the present invention.

The semaphore mechanism operates according to a state diagram given in FIG. 14. When the I/O module 210 is powered up, the state diagram starts in semaphore available state 1500 where the semaphore is available to either the network module 200 or the I/O module 210. The I/O module 210 stays in the semaphore available state 1500 until either (1) the network module 200 asserts a semaphore request, or (2) the I/O module 210 performs a local semaphore seizure 1562.

If the network module 200 asserts a semaphore request 1550, the state diagram transitions to the semaphore non-trivially granted state 1505. As mentioned above, the I/O module 210 implements this transition by setting the S_Ack and S_Gnt* bits of the semaphore register to 1 and 0 respectively within the read cycle of the semaphore request 1550. By setting the semaphore status bits in this fashion, the I/O module 210 signals to the network module 210 that the semaphore request 1550 has been non-trivially granted, i.e. the semaphore was not owned by the network module 210 prior to the current semaphore request 1550. In the semaphore non-trivially granted state 1505, the network module 200 may freely access (read/write) the data and/or configuration registers of the I/O module 210.

From the semaphore non-trivially granted state 1505, a semaphore request 1554 induces a transition to the semaphore already owned state 1510. The I/O module 210 implements this transition by setting the S_Ack and S_Gnt* bits of the semaphore register to 1 and 1 respectively within the read cycle of the semaphore request 1554. By setting the semaphore status bits in this fashion, the I/O module 210 signals to the network module 210 that the semaphore request 1554 has been trivially granted, i.e. semaphore has already owned by the network module 200 prior to the current semaphore request 1554. In the semaphore already owned state 1510, the network module 200 may freely access (read/write) the registers of the I/O module 210 just as in semaphore non-trivially granted state 1505.

From the semaphore already owned state 1510, a semaphore request 1556 induces a null transition, i.e. the state does not change. The semaphore status bits S_Ack and S_Gnt* do not change and therefore maintain their values 1 and 1 respectively. From the semaphore already owned state 1510, a semaphore release 1558 asserted by the network module 200 induces a transition to the semaphore available state 1500.

From the semaphore non-trivially granted state 1505, a semaphore release 1552 asserted by the network module 200 induces a transition to the semaphore available state 1500.

From the semaphore available state 1500, a local semaphore seizure 1562 asserted by the I/O module 210 induces a transition to the local semaphore ownership state 1515. The I/O module 210 may freely access (read and/or write) the data registers and/or configuration registers of the I/O module 210 during local semaphore ownership state 1515. The I/O module 210 is said to own the semaphore during local semaphore ownership state 1515. Local semaphore ownership state 1515 is a composite state composed of two sub-states. The local semaphore seizure 1562 induces a transition to initial local ownership state 1515A. From the initial local ownership state 1515A, a semaphore request 1564 asserted by the network module 200 induces a transition to the semaphore requested state 1515B. The I/O module 210 implements this transition by setting the S_Ack and S_Gnt* bits of the semaphore register to 0 and 1 respectively within the read cycle of the semaphore request 1564. By setting the semaphore status bits in this fashion, the I/O module 210 denies the semaphore request 1564 asserted by the network module 200.

When the I/O module 210 no longer needs access to the data/configuration registers of the I/O module 210, it relinquishes the semaphore. From state 1515A, local semaphore relinquish 1572 asserted by the I/O module 210 induces a transition to the semaphore available state 1500. From the semaphore requested state 1515B, local semaphore relinquish 1574 asserted by the I/O module 210 induces a transition to the semaphore reserved for network module state 1525. In the semaphore reserved for network module state 1525, the I/O module 210 may not regain control of the semaphore. This is illustrated by the null transition from state 1525 to itself in response the I/O module requesting the semaphore. From the semaphore reserved for network module state 1525, a semaphore request 1576 asserted by the network module 200 induces a transition to the semaphore non-trivially granted state 1505. The I/O module 210 implements this transition by setting the semaphore status bits the S_Ack and S_Gnt* bits to 1 and 0 respectively. By setting in the bits in this fashion, the I/O module 210 informs that network module 210 that the semaphore has been non-trivially granted, i.e. that the semaphore is now granted and was not granted prior to the current semaphore request 1576.

From the semaphore reserved for network module state 1525, a semaphore release 1578 asserted by the network module 200 induces a transition to the semaphore available state 1500. By asserting semaphore release 1578, the network module 200 allows the I/O module 210 to have access to the semaphore.

From semaphore requested state 1515B, a semaphore request 1566 asserted by the network module 200 induces a trivial transition to the semaphore requested state 1515B. The I/O module 210 implements this transition by setting the S_Ack and S_Gnt* bits of the semaphore register to 0 and 1 respectively. By setting the semaphore status bits in this fashion, the I/O module 210 signals to the network module 200 that the semaphore request 1566 has been denied. From semaphore requested state 1515 B, a semaphore release 1568 asserted by the network module 200 induces a transition to the initial local ownership state 1515A.

As alluded to earlier, the semaphore control algorithm of the I/O module 210 enforces a maximum time that the I/O module 210 may control the semaphore after a denied semaphore request. In terms of the state diagram, this implies that the I/O module 210 may remain in semaphore requested state 1515B no longer than the semaphore request time.

It is noted that by a natural extension the semaphore mechanism described above, alternate embodiments are easily conceived wherein (1) each I/O module 210 uses more than one semaphore, and/or (2) each I/O module 210 uses one or more semaphores per logical channel.

Status Register

The status register is a single byte read-only register which indicates the state of the I/O module 210 as a whole, and of a logical channel in particular. When the network module 200 reads an I/O module 210 with Function Code equal to 0 or 1, the contents of the status register are returned on data lines D[7:0] of the parallel bus. The following table lists the name of the status bits conveyed on each data line D[7:0].

Returned Data Contents:

| D7 | D6 | D5 | D4 | D3 | D2 | D1 | D0 |
|---|---|---|---|---|---|---|---|
| S_Gnt* | S_Ack | MST2 | MST1 | MST0 | SCO | CST1 | CST0 |

The upper six bits corresponding to D[7:2] indicate the status of the I/O module 210 as a whole. The lower two bits corresponding to D[1:0] indicate the status of a particular logical channel. Reading the I/O module 210 with Function Code 0 comprises a semaphore request. In this case, only the upper six bits of the status register contents are valid. As described above, the response of the I/O module 210 to the semaphore request is indicated by the values of the S_Gnt* and S_Ack bits. That is, the active-low assertion of the RD* line initiating the semaphore request induces the I/O module 210 to update the semaphore status bits S_Gnt* and S_Ack according to the semaphore state diagram of FIG. 14. These status bits as well as the other four status bits MST[2:0] and SCO are updated before the de-assertion of the RD* line which concludes the semaphore request read cycle.

When reading the I/O module 210 with Function Code 0, the logical channel address conveyed on channel select lines CH[3:0] is ignored as illustrated in the following table.

Semaphore Request Addressing:

| Name: | MD3 | MD2 | MD1 | MD0 | CH3 | CH2 | CH1 | CH0 | FC |
|---|---|---|---|---|---|---|---|---|---|
| Value: | Module Address | | | | Channel Number | | | Arbitrary | 0 |

The Module Select lines MS[3:0] determine the I/O module 210 to be addressed. The I/O module 210 closest to the network module 200 has address 0000b, and I/O modules 210 successively farther from the network module 200 have corresponding larger addresses. The Channel Select lines CH[3:0] are normally used to address a particular logical channel of an I/O module 210. However, in the case of a semaphore request these lines are ignored.

In order to report the status of logical channels, the I/O module 210 maintains a pair of channel status bits CST[1:0] for each of the logical channels. To access the channel status bits for a particular logical channel, the network module 200 reads the I/O module 210 with Function Code 1. The two least significant bits of the status register convey the channel status bits CST[1:0] for the addressed logical channel, and are guaranteed to be valid only if the semaphore has been granted to the network module 200. The upper six bits of the status register have the same meaning as in a semaphore request, and are valid whether or not the semaphore has been granted to the network module 200. In the case of a channel status read, the channel select lines CH[3:0] denote the logical channel to be addressed.

Definition of the Status Register Bits

The S_Ack bit is also known as the Semaphore Acknowledge bit. A "1" value for this bit indicates that the network module 200 possesses the semaphore, and thus has permission to access the data, configuration, or command registers of the I/O module 210. A "0" value for this bit indicates that the network module 200 does not possess the semaphore, and thus does not have permission to access the data, configuration, or command registers of the I/O module 210. Although this bit is not very useful if the I/O module 210 is not physically present, its value is defined to be "1" if the MST status is "No Base" and a "0" if the MST status is "Base but no module". See below the definition of the MST bits.

The S_Gnt* bit, also known as the Semaphore Granted bit, is meaningful only in response to a semaphore request. When the S_Ack bit indicates that the network module 200 possesses the semaphore (i.e. S_Ack=1), the S_Gnt* bit provides the following qualification. A "0" value for the S_Gnt* bit indicates that permission to access the I/O module 210 was newly granted to the network module 200 during the current semaphore request. A "1" value for the S_Gnt* bit indicates that the network module 200 already had possession of the semaphore prior to the current semaphore request. Although, the S_Gnt* bit is not very meaningful if the addressed I/O module 210 or addressed terminal base 220 is not physically present, it takes the value "1" in these cases. The MST bits, also known as the Module Status bits, indicate the status of the selected I/O module 210. The various bit patterns for the MST bits and the corresponding conditions they represent are sunmmarized in the table below. The MST bit pattern 1-1-X indicates that the addressed terminal base 220 is not physically present. The MST bit pattern 1-0-X indicates that the addressed terminal base 220 is present, however no I/O module 210 is installed in the addressed terminal base 220.

| Module Status Condition | MST_2 | MST_1 | MST_0 |
|---|---|---|---|
| No Base | 1 | 1 | x |
| Base, but no module | 1 | 0 | x |
| Module Unconfigured | 0 | 0 | 0 |
| Module Not Ready | 0 | 0 | 1 |
| Module Ready | 0 | 1 | 1 |

When an I/O module 210 is initially powered up, the MST bits are set with the pattern 0-0-0 indicating that the I/O module 210 is in the so called "Module Unconfigured" state. The I/O module 210 remains in the Module Unconfigured state until the configuration table of the I/O module 210 is written to for the first time. The configuration table of an I/O module 210 is defined as the ensemble of all configuration register spaces for the I/O module 210. In response to the first write access to the configuration table, the I/O module 210 sets the MST bits with the bit pattern 0-0-1 indicating that the I/O module 210 has entered the "Module Not Ready" state. At this point, the I/O module 210 does not know which of the logical channels have received new configuration information, and therefore it cannot guarantee that any of the data registers are valid. Thus, upon entering the Module Not Ready state, the I/O module 210 scans its configuration table to determine which (if any) of the configuration register spaces were altered during the recent configuration table write access. For each logical channel whose configuration register space was altered, the I/O module 210 sets the channel status to "Unconfigured" by setting the corresponding CST[1:0] bits with the pattern 00*b*. Then the I/O Module returns to the "Module Ready" state by setting the MST bits with the pattern 0-1-1.

The I/O module 210 remains in the Module Ready state until the network module 200 writes the configuration table of the I/O module 210, at which time the I/O module 210 enters the "Module Not Ready" state which is again signaled by setting the MST bits to 0-0-1. As described above, upon entering the Module Not Ready state, the I/O module 210 scans the configuration table to identify the logical channels which have received new configuration values, and sets the channel status for these logical channels to Unconfigured. After this updating of the channel status information, the I/O module 210 returns to the Module Ready state (MST=011). Thus, the I/O module 210 resides in the Module Ready state except for short time intervals following a configuration table write access. Upon returning to the Module Ready state, the I/O module 210 reconfigures each of the logical channels which received new configuration information. When the reconfiguration of a given logical channel is complete, the I/O module 210 sets the corresponding CST[1:0] bits to 11*b* indicating that the channel status is "Good". In the "Good" state, the data register of the logical channel is guaranteed to conform to the current values of the corresponding configuration register space. In contrast, in the Unconfigured state, the data in the channel's data register does not correspond to the settings in its configuration register. A channel will always be in the Unconfigured state when the I/O module 210 is in either the "Unconfigured" state or "Module Not Ready" state, i.e. MST bits equal 000*b* or 001*b* respectively.

As an example of a channel reconfiguration, suppose that the I/O module 210 is an analog input module, and the network module 200 writes to the configuration register of a logical channel in order to set the input voltage range for that channel. Then the channel status bits CST[1:0] will indicate an Unconfigured channel until the I/O module 210 loads a new data point corresponding to the new range into the channel's data register.

In addition to the "Good" status and the "Unconfigured" status, a logical channel can have one of two "Bad" statuses. The following table lists the status indication provided by each of the possible CST bit patterns.

| Channel Status | CST_1 | CST_0 |
|---|---|---|
| Good | 1 | 1 |
| Unconfigured | 0 | 0 |
| Bad Status "A" | 0 | 1 |
| Bad Status "B" | 1 | 0 |

Recall that each I/O module 210 includes non-volatile memory in which is stored a Module Information Structure (MIS). The MIS includes one or more Channel Information Structures. A Channel Information Structure (CIS) defines a channel format which may be assigned to one or more logical channels. The CIS includes a definition for one or both of the "Bad" statuses which are referred to as "Channel Specific Error A" and "Channel Specific Error B". Examples for channel specific errors include "Input Out of Range", "Short Circuit Detected", and "Open Thermocouple".

The CST bits of the status register are valid only if the addressed terminal base 220 and I/O module 210 are physically present, and if the semaphore of the I/O module 210 has been granted to the network module 200.

The SCO bit, also known as the Serial Communication Open bit, reflects the state of the I/O module 210 in relation to the serial bus 243. When the SCO bit is high, the I/O module 210 is opened to the serial bus 243. This bit is not valid when the module status (MST) is "No Base".

Accessing an I/O Module

Figure 15:
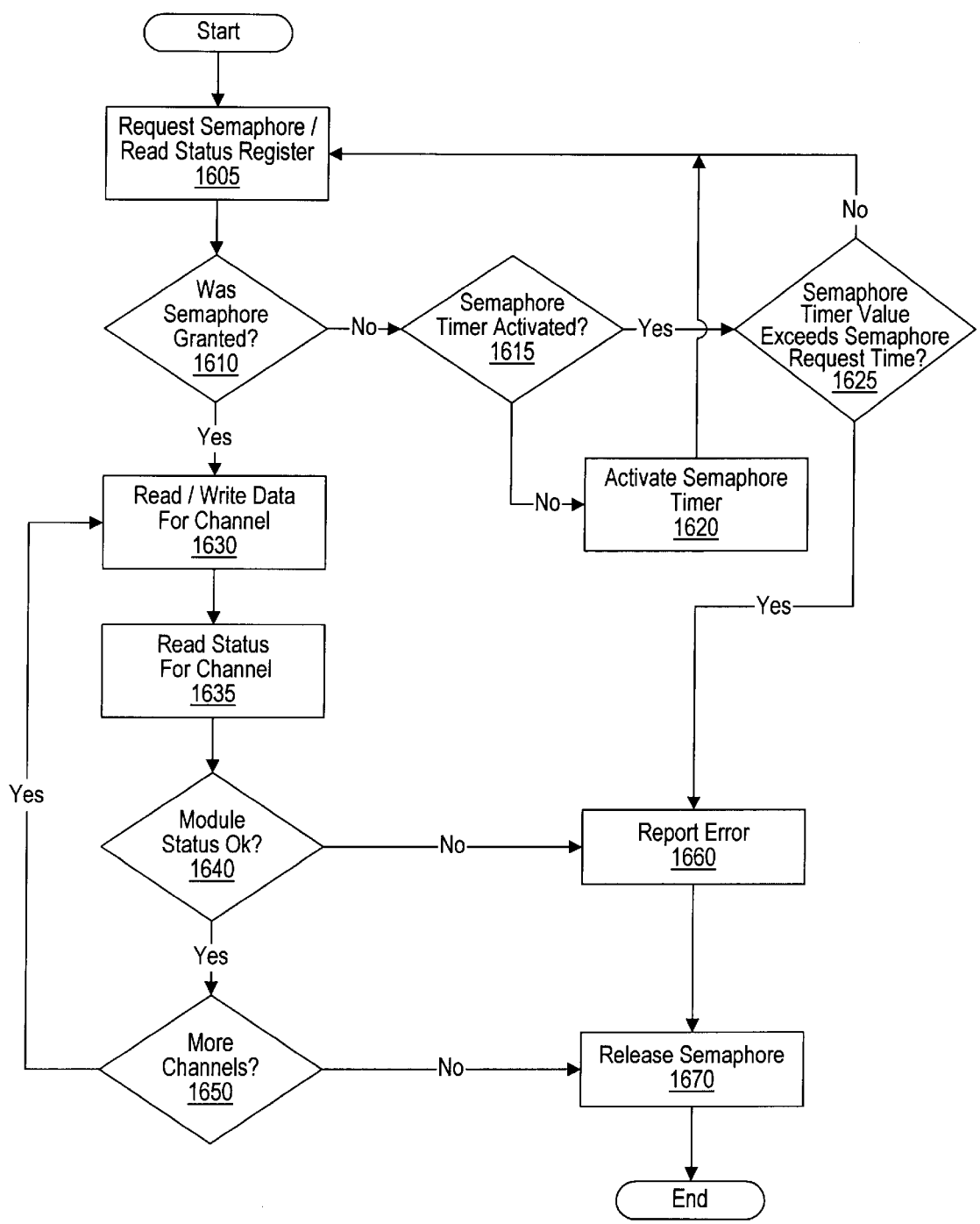
FIG. 15 is a flowchart of the method by which the network module 200 accesses the register space(s) of an I/O module 210 according to the present invention.

According to one embodiment, the network module 200 accesses an I/O module 210 as shown in FIG. 15. In order to access an I/O module 210, the network module 200 must first obtain the semaphore of the I/O module 210. To this end, in step 1605, the network module 200 requests the semaphore by reading the I/O module 210 with Function Code set to 0. In response to the semaphore request read, the I/O module 210 returns on Data lines D[7:0] the contents of the status register. In step 1610, the network module 200 tests the S_Gnt* and S_Ack bits of the returned status byte to determine if the semaphore request was granted or denied. If the semaphore request was denied, the network module 200 proceeds to step 1615. As described above, the I/O module 210 is guaranteed to relinquish the semaphore within the semaphore request time after a denied semaphore request. When the I/O module 200 is initially inserted into a terminal base, the network module 200 reads the module information structure (MIS) of the I/O module 210. Since the semaphore release time is one of the embedded parameters of the MIS, the network module 200 may use the semaphore request time to determine an optimal semaphore request strategy with respect to the I/O module 210.

According to the present embodiment, the network module 200 includes a semaphore timer which is used to control the timing of semaphore requests. In step 1615, the network module 200 determines whether the semaphore timer has been activated. If the semaphore timer has not been activated, the semaphore timer is activated in step 1620, and the semaphore request (step 1605) is re-asserted.

If, in step 1615, the semaphore timer has been activated, the semaphore timer value is compared with the semaphore request time in step 1625. If the semaphore timer value does not exceed the semaphore request time, the network module 200 re-asserts the semaphore request (step 1605) preferably after waiting for a retry interval. If, in step 1625, the semaphore timer value exceeds the semaphore request time, the network module 200 reports an error condition associated with the I/O module 210 as shown in step 1660.

If, in step 1610, the semaphore was granted in response to the semaphore request of step 1605, the network module 200 performs any pending read/write operations for a selected channel in the I/O module 210. After completing the pending read/write operations for the channel, the network module 200 performs a status read on the selected channel as shown in step 1635. In step 1640, the network module 200 tests the status register contents returned by the status read of step 1635. If the status bits reflect an error condition, the network module 200 reports the error in step 1660. Otherwise, the network module 200 determines whether there are pending read/write operations to be performed for any other channels of the I/O module as shown in step 1650. If there are other channels with pending read/write operations, the network module 200 selects one of these other channels and performs the reads/write operations for the newly selected channel as shown in step 1630. If, in step 1650, the network module 200 determines that there are no remaining channels with pending read/write operations to be performed, the network module 200 asserts a semaphore release as shown in step 1670.

Module Information Structure

Each I/O module 210 contains non-volatile memory in which is stored a Module Information Structure. The Module Information Structure (MIS) contains information which characterizes the I/O module 210. When an I/O module 210 is inserted to a terminal base 220, the network module 200 reads the MIS of the I/O module 210 via serial bus 243. The contents of the MIS determine how the network module 200 is to interact with the I/O module 210. I/O modules 210 of a given type have identical Module Information Structures. For example, all analog output modules AO-8 have identical Module Information Structures.

An MIS comprises a Module Description and one or more Channel Information Structures. Refer now to FIG. 16, collectively comprising FIGS. 16A and 16B, for a table describing the organization of the MIS. The Module Description comprises the first portion of the MIS. The Module Description contains information pertaining to the I/O module 210 as a whole and to the MIS itself. The Module Description includes the following fields.

[MIS Length] The MIS Length parameter describes the length of the MIS in bytes. The MIS Length parameter is a one word integer.

[Module ID] The Module ID corresponds to the module type of the I/O module 210.

[Hot Swap ID] I/O Modules 210 with the same Hot Swap ID have the same register space (Data, Configuration, and Command), and therefore can be hot-swapped for one another. The Hot Swap ID is a one byte integer.

[Module Name Length] The Module Name Length parameter specifies the length in bytes of the following "Module Name" character string.

[Module Name] The Module Name field is a character string with length up to 255 bytes. The Module Name string specifies the name of the I/O module 210.

[Serial Number] No two I/O module 210 of a given type have the same Serial Number. The Serial Number is a long word integer.

[Semaphore Request Time] The Semaphore Request Time is the maximum length of time (in microseconds) the I/O module 210 can remain in the semaphore requested state 1515B (of FIG. 14). The network module 200 uses this parameter to determine the maximum time necessary to acquire the semaphore. The Semaphore Request Time is a one byte integer.

[Number of CiSes] The Number of CISes parameter specifies the number of Channel Information Structures which are to follow in the Module Description. The Number of CISes parameter is a one byte integer.

[Number of Physical Channels] Defines the number of physical channels in the I/O module 210. This is not necessarily equal to the number of logical channels, since multiple physical channels may correspond to a single logical channel. The Number of Physical Channels parameter is a one byte integer.

Channel Information Structures

The Module Description is followed by a number of Channel Information Structures determined by the Number of CISes parameter described above. Each Channel Information Structure defines a channel format which may be applied to one or more logical channels. A Channel Information Structure includes the following fields.

[CIS Length] The CIS Length parameter specifies the length of the CIS in bytes. The CIS Length is an unsigned word integer.

[CIS ID] The CIS ID specifies a numerical ID for the channel type defined by the CIS. Channel Information Structures with identical CIS ID's are identical. Channel Information Structures with the same most significant byte define the same register structure, i.e. define identical data, configuration, and command registers.

[Channel Repetition Count] The Channel Repetition Count specifies the number of consecutive logical channels in the present I/O module 210 which conform to the present CIS definition.

[Channel Type] The Channel Type parameter specifies a channel type according to the following tabulated list.

| | | |
|---|---|---|
| 0 | Discrete Input | Data passed as a word of [Data Length] |
| 1 | Discrete Output | Boolean values |
| 2 | Analog Input | Data passed as an integer with [Data Length] bits |
| 3 | Analog Output | representing a real number |
| 4 | Count Input | Data passed as an integer with [Data Length] bits |
| 5 | Count Output | |

[Points] The Points parameter specifies the number of points associated with any logical channel conforming to the present CIS.

[Number of Error Messages] Each logical channel can have up to two diagnostic error messages, corresponding to the Bad Status A and B states returned in the CST bits of the Status Register. These messages/states are given IDs and text strings so that they may be either machine or human readable. A channel may use both A and B, A only, or neither A nor B. Accordingly, the Number of Error Messages parameter therefore takes one of the values 0, 1, or 2. A number of Error Message Descriptions corresponding to the Number of Error Messages follows.

[Error Message "A/B" ID] The machine-readable ID of the Error Message for the "Bad Status A/B" state of the logical channel.

[Error Message "A/B" Length] The length of the next string, [Error Message "A/B" String].

[Error Message "A/B" String] The human readable string message for the "Bad Status "A/B" State. This string has length less than 256 bytes.

[Number of ranges] The number of ranges supported by this logical channel format. Each range has an associated Range description which includes Range ID, Data Length, Data Units, Lower Limit Value, and Upper Limit Value. The first range described is the default range which the I/O module will assume.

[Range ID] A unique ID for this data range. A Range ID of 255 is reserved as a "null" range. For example, the range "4–20 mA" has range ID of 0. Any I/O module 210 supporting the range "4–20 mA" must give it the Range ID of 0. However, not all I/O modules 210 with a "4–20 mA" range must have identical Range descriptions for the range. One module might have a Data Length of 12 while another has a Data Length of 16. Also, one might have a full scale value of 20.000e-3 while another has overrange capabilities and a full scale value of 21.000e-3.

[Data length] The number of bits of data associated with each point of the present logical channel format. If the Data Length parameter is greater than 1 bit, each point of the data register will be right justified on a byte boundary, with any unused bits filling up the most significant bit positions. For Discrete I/O logical channels, the Data Length parameter is usually 1, in which case eight one- bit points are represented by one byte of the data register. For Count I/O channels, the Data Length parameter is the number of right justified significant bits in the data. For Analog I/O channels, a positive number N implies an unsigned integer value of N significant, right justified bits. A negative number - N implies a signed, two's complement integer of N significant, right justified bits. The bits to the left of the MSB in integer values should be taken as don't care bits which could have arbitrary values. The data value for a point can take any value in the range from 0 to $2^N-1$ for unsigned data [from $-2^{(N-1)}$ to $2^{(N-1)}-1$ for signed data]. This data range maps onto an associated range defined by the parameters [Lower Limit Value] and [Upper Limit Value].

[Data Units] The Data Units parameter describes the units associated with [Lower Limit Value] and [Upper Limit Value] parameters. It also determines the data type of both the data value and the Upper and Lower Limit Values. The units corresponding to each value of the Data Units parameter is given in the following table.

[Lower Limit Value] The Lower Limit Value parameter defines the lower limit of a numeric range. The Data Units parameter specifies the units which are associated with the Lower Limit Value. For Boolean input or output types, the Lower Limit Value is all zeros. For Count types, this is the minimum (or most negative, for signed counts) value which can be measured or output. The Lower Limit value is of the same type as the data value. For Analog types, this is an 8-byte floating point value describing the value associated with the minimum (most negative) integer data value.

[Upper Limit Value] The Upper Limit Value parameter defines the upper limit of the numeric range whose lower limit is given by the Upper Limit Value. The Data Units parameter specifies the units are associated with the Upper Limit Value. For Boolean types, the Upper Limit Value is all ones. For Count types, the Upper Limit Value is the maximum (or most positive, for signed counts) value which can be measured or output; and the Upper Limit Value is of the same type as the data value. For Analog types, the Upper Limit Value is an 8-byte floating point value describing value associated with the maximum (most positive) integer data value.

[Number of Attributes] The number of independent attributes of the logical channel format. These attributes may be programmable (more than one setting) or not (only one setting). Each attribute has an associated description which includes an Attribute ID, Attribute Name Length, Attribute Name, Attribute Length, Type of Settings, and a description of the possible Settings for the Attribute.

[Attribute ID] A unique ID for this attribute. For example, the attribute "Noise Rejection" has range ID of 1. Any module supporting the range "Noise Rejection" must give it the ID of 1. (An Attribute ID of 255 is reserved as a "null" attribute with no settings.)

[Attribute Name Length] The number of characters in the following string field.

[Attribute Name] Text string giving the name of the attribute.

[Attribute Length]: Even though all attribute settings are unsigned 8-bit numbers, it is possible that consecutive attributes represent the consecutive bytes of a larger number. For example, an counter module may have two attributes, "Initial Count LSB" and "Initial Count MSB", where the settings of these two attributes represent a single, 16-bit, "virtual" attribute of the counter. For all practical purposes, "Initial Count LSB" and "Inital Count MSB" can be treated as two separate attributes. However, it may be desireable to have some way of recognizing that these attributes can be concatenated or typecast to a larger number, other than simply by using terms like "MSB" or "LSB" in the name. This field is used to describe the size of a "virtual" attribute. A value of one in this field implies that the attribute is a single byte and is not part of any larger "virtual" attribute. A value larger than one implies that the attribute represents the first (least significant) of multiple consecutive bytes. The value of this field is the total number of bytes in the "virtual" attribute. A value of zero implies that the attribute represents one of the other (not the first) bytes of a "virtual" attribute. Note: This field is only valid for integer settings (see the next field, [Type of Settings]). For enumerated settings, this field should contain zero.

[Type of settings] The allowable Settings for the current Attribute may be specified either (a) through an enumerated list of allowable Settings, or (b) through a minimum and maximum value defining an integer range of allowable Settings. The Type of Settings parameter takes the value 0 if the allowable Settings are to be specified through an enumerated list, and the value 1 if through a minimum and maximum value. Enumerated settings may or may not be programmable, while integer settings are always programmable.

If the Type of Settings parameter takes the value 0, then the allowable Settings for the Attribute are described by the following fields:

[Number of Valid Settings]: The Number of Valid Settings parameter specifies the number of Settings which are allowed for this attribute. A value of 1 implies an Attribute which is not programmable (since there is only one setting to choose from). The Number of Valid Settings parameter is followed by a corresponding number of Setting Descriptions. Each Setting Description includes a Setting ID, Setting Name Length, and Setting Name.

[Setting ID] The Setting ID is a unique ID for the present Setting of the present Attribute. For example, the Attribute "Noise Rejection" has a Setting of "10 Hz" with a Setting ID of 0. Any module supporting the Setting "10 Hz" for the Attribute "Noise Rejection" must give it the Setting ID of 0. A Setting ID of 255 is reserved as a "null" setting

[Setting Name Length] The Setting Name Length parameter specifies the length of the following text string [Setting Name].

[Setting Name] The string Setting Name gives a textual description of the present Setting. The length of the string Setting Name is less than 256 bytes.

If the Type of Settings parameter takes the value 1, then the allowable Settings for the Attribute comprise a range of integer values defined by the following fields:

[Minimum Setting] The Minimum Setting parameter defines the minimum allowed value that an Setting can achieve. If the value of the Minimum Setting parameter is greater (more positive) than the Maximum Setting parameter, then both the Minimum Setting and Maximum Setting are to be interpreted as signed values. Otherwise, they are to be interpreted as unsigned values.

[Maximum Setting]: The Maximum Setting parameter defines the maximum allowed value that a Setting can achieve. If the value of the Minimum Setting parameter is greater (more positive) than the Maximum Setting parameter, then both the Minimum Setting and Maximum Setting are to be interpreted as signed values. Otherwise, they are to be interpreted as unsigned values.

[Default Setting] The Default Setting parameter specifies the Setting which is to be used as the default value for the present channel format. If Settings are enumerated, the Default Setting equals one of the allowable Setting IDs. If Settings are defined by an integer range, the Default Setting is an integer Setting in the range between Minimum Setting and Maximum Setting.

[Number of Command Registers]: The Number of Commands Registers parameter defines the number of single byte command registers for present logical channel format. Each register may represent one or more commands. Each Command Register has an associated Command Description which includes a Command Register ID, a Command Register Name Length, a Command Length, and a description of the allowable values for the present Command.

[Command Register ID] A unique ID for this Command Register. A Command Register ID of 255 is reserved as a "null" command.

[Command Register Name Length]: The number of characters in the following text string, i.e. [Command Register Name].

[Command Register Name] The name of the Command Register.

[Command Length]: Even though all command registers are unsigned 8-bit registers, it is possible that consecutive commands represent the consecutive bytes of a virtual Command Register. For example, an counter module may have two command registers, "Set Terminal Count LSB" and "Set Terminal Count MSB", where these two command registers represent a single, 16-bit, "virtual" command to the counter. For all practical purposes, "Set Terminal Count LSB" and "Set Terminal Count MSB" can be treated as two separate commands. However, it may be desirable to have some way of recognizing that these commands can be concatenated or typecast into a larger command, other than simply by using terms like "MSB" or "LSB" in the name. This field is used to describe the size of a "virtual" command. A value of one in this field implies that the command register is a single byte and is not part of any larger "virtual" command. A value larger than one implies that the command register represents the first (least significant) of multiple consecutive bytes. The value of this field is the total number of bytes in the "virtual" command. A value of zero implies that the command represents one of the other (not the first) bytes of a "virtual" command. Note: This field is only valid for integer Command Settings (see the next field, [Type of Commands]). For enumerated settings, this field should contain zero.

[Type of Commands] The allowable value for a Command Register may be specified either (a) through an enumerated list of allowable values, or (b) through a minimum and maximum value which defines an integer range of allowable values. The Type of Commands parameter takes the value 0 if the allowable values are to be specified by an enumerated list, and the value 1 if the allowable values are to be specified by a minimum and maximum value.

If the Type of Commands parameter takes the value 0, the allowable values for the present Command Register are defined as follows.

[Number of Valid Commands] The Number of Valid Commands parameter specifies the number of commands which are allowed for the present Command Register. The Number of Valid Commands parameter is followed by a corresponding number of Command Descriptions. Each Command Description includes a Command ID, a Command Name Length, and a Command Name.

[Command ID] The Command ID specifies a unique ID for the current command. A value of 255 is reserved as a "null" command.

[Command Name Length]: The Command Name Length parameter specifies the number of characters in the following text string, [Command Name].

[Command Name] The Command Name parameter gives the a text description of the present Command. The Command Name string is less than 256 bytes long.

If the Type of Commands parameter takes the value 1, the allowable commands comprise an integer range defined by the following maximum and minimum values.

Integer Command descriptions: An integer command is described by its minimum and maximum allowable values. Zero is not a valid maximum or minimum value, since it is reserved as a null operation in all command registers.

[Minimum Value] The Minimum Value parameter defines the minimum value for an integer range of allowable command values. If this Minimum Value is greater (more positive) than the following Maximum Value, both the Minimum Value and the Maximum Value are to be interpreted as signed values. Otherwise the Minimum Value and Maximum Value are to be interpreted as signed values.

[Maximum Value] The Maximum Value parameter defines the maximum value for the integer range of allowable command values. If this Minimum Value is greater (more positive) than the preceding Maximum Value, both the Minimum Value and the Maximum Value are to be interpreted as signed values. Otherwise the Minimum Value and Maximum Value are to be interpreted as signed values.

Calibration Information in the Module Information Structure

In one embodiment of the present invention, the Module Information Structure (MIS) may be used to store calibration information for the I/O module 210. In the factory, before an I/O module 210 is shipped, an I/O module 210 may be subjected to a calibration test. For an input module, a calibration test aims at characterizing the functional relationship between a reference input and the corresponding measured value for each of the channels of the module. Conversely, for an output module, a calibration test aims at characterizing the functional relationship between the data value driving a channel and the corresponding signal output, for each of the channels of the module. In either case, the calibration fuinction may be summarized by a set of parameters and stored in the MIS. Later, when the I/O module 210 is installed in a module bank, the I/O module 210 may read the calibration parameters for a given channel and use these parameters to correct measured data values in the case of an input channel, and to adjust data values before driving an output in the case of an output channel.

For efficiency of storage and computational speed in field data correction, the calibration function may be linearized, and the corresponding gain and offset parameters stored as two-point correction information for the corresponding channel. For more accuracy in field correction, the calibration may be approximated as an No order polynomial, and the (N+1) coefficients of the polynomial stored as an (N+1) point correction information for the corresponding channel.

It is also noted that the network module 200 may used the calibration information in the MIS to perform data correction instead of the I/O module 210. As mentioned above, the network module 200 read the MIS of the I/O module 210 when the I/O module in inserted into an active terminal base. Thus, the network module 210 may apply any necessary corrections to input and output data values based on the calibration parameters read from the I/O module 210 on a per channel basis.

Reading the Module Information Structure

The Module Information Structure of an I/O module 210 is accessed by selecting the I/O module 210 with the MS[3:0] lines and reading the MIS from the serial bus. In the preferred embodiment of the invention, the serial bus comprises an SPI serial interface face. The SPI serial interface comprises the lines SPI_CS*, MISO, MOSI, and SPI_CLK lines. It is noted that the SPI serial interface of the present invention differs from standard SPI interfaces in that data is sent out LSB first on the SPI serial interface, while standard SPI sends data MSB first. This deviation simplifies interfacing to UARTS and serial ports in the network module 200 which accept data LSB first. It should also be pointed out that for multiple byte entries, data comes out the serial port least significant byte first.

The SPI serial interface on the local bus can be set to "point" to one of the 16 possible I/O modules 210 by performing a read on the I/O module 210 while the SPI_CS* line is held low. The SPI interface will continue to point to this module until a read on another module is performed with the SPI_CS* line low. Thus the network module 200 may read the MIS of one module while it services other resources (i.e., data I/O and configuration table writes) on either the same or different I/O modules 210 over the local bus. However, it is also important to note that the SPI interface may only point to one I/O module 210 at a time, and that it must always point to some address. In general, it would be good to have the SPI interface point to either an unused address or to the address of the network module, if possible, during idle times.

After pointing the SPI interface to an I/O module 210, the network module 200 initiates an MIS read by writing a predefined bit pattern over the MOSI Line. During this write operation, the data coming in from the MISO Line will be all ones. After writing the initiation pattern, the I/O module 210 will clock out the MIS values on the MISO Line. The MOSI Line from the network module 200 will be a "don't care" after the previous pattern. This will allow using open collector buffers to send both the local bus data in and data out lines to a single serial data line on the network module microcontroller.

Watch Dog

The Watch Dog feature allows a network module 200 to detect a communication failure condition and to respond in a user-defined way. If the Watch Dog feature is enabled for a given network module 200, the network module 200 monitors activity on network bus 120. In other words, the network module 200 detects any signal activity on network bus 120, not merely messages targeted to the network module 200 itself. If inactivity persists for longer than a preprogrammed amount of time given by the Watch Dog Timeout value, the network module 200 assumes that the communication link with computer 100 has failed. In response to the detected communication failure, the network module 100 writes a series of user-defined values to selected channels/modules of the module bank as specified by a Watch Dog Database stored in non-volatile memory. Software running on computer 100 provides the user with commands for:

(1) Setting a data value in the Watch Dog Database for a selected I/O module and selected channel, where the data value is applied to the selected channel/module in case of communication failure;

(2) Setting (or Clearing) a Channel Enable Flag in the Watch Dog Database, associated with a selected channel of an I/O module 210, where the Channel Enable Flag controls whether or not the data value of (1) above is applied to the selected channel in case of communication failure;

(3) Setting (or Clearing) a Module Enable Flag in the Watch Dog Database, associated with a selected I/O module 210;

(4) Writing a selected network module 200 to set the Watch Dog Timeout value for the corresponding module bank, and (5) Enable the Watch Dog Monitor for a user-specified network module 200.

A Module Enable Flag, when set, implies that the Channel Enable Flag will determine whether or not the corresponding data value will be applied in case of communication failure. A Module Enable Flag, when cleared, implies that none of the data values will be applied to their respective channels in case of communication failure.

When the user issues a command to enable the Watch Dog feature for a network module 200, the network module 200 does not immediately enable the Watch Dog Monitor. Instead, according to the present invention, the network module 200 waits for a first message from computer 100, subsequent to the enable command, and targeted for the network module 200. The network module 200 enables the Watch Dog Monitor when this first subsequent message is received. Once the Watch Dog Monitor has started, computer 100 is responsible to maintain activity on network bus 120 to prevent the Watch Dog Monitor from timing out, and the Watch Dog Database values being assumed.

This delayed enabling of the Watch Dog Monitor allows the user to assert a Watch Dog Enable command before invoking an application which is to communicate with the network modules 200. A large software application may take as long as necessary to load and execute since a network module 200 will not enable the Watch Dog Monitor until a first message targeted to the network module 200 is received. However, once the application starts writing to the network module, the application is responsible to write to the network module repeatedly to prevent the Watch Dog Monitor from timing out. Thus, the delayed enabling feature of the present invention allows computer 100 to take as much time as necessary to transition from configuration mode to operational mode.

In the preceding discussion, the network module 200 has been described as detecting activity on network bus 120. In one embodiment of the invention, this function is performed by dedicated hardware within the network module 200 referred to as a signal activity detector. In another embodiment of the invention, the signal activity detector is implemented by the CPU of the network module 200 under software control.

Figure 17:
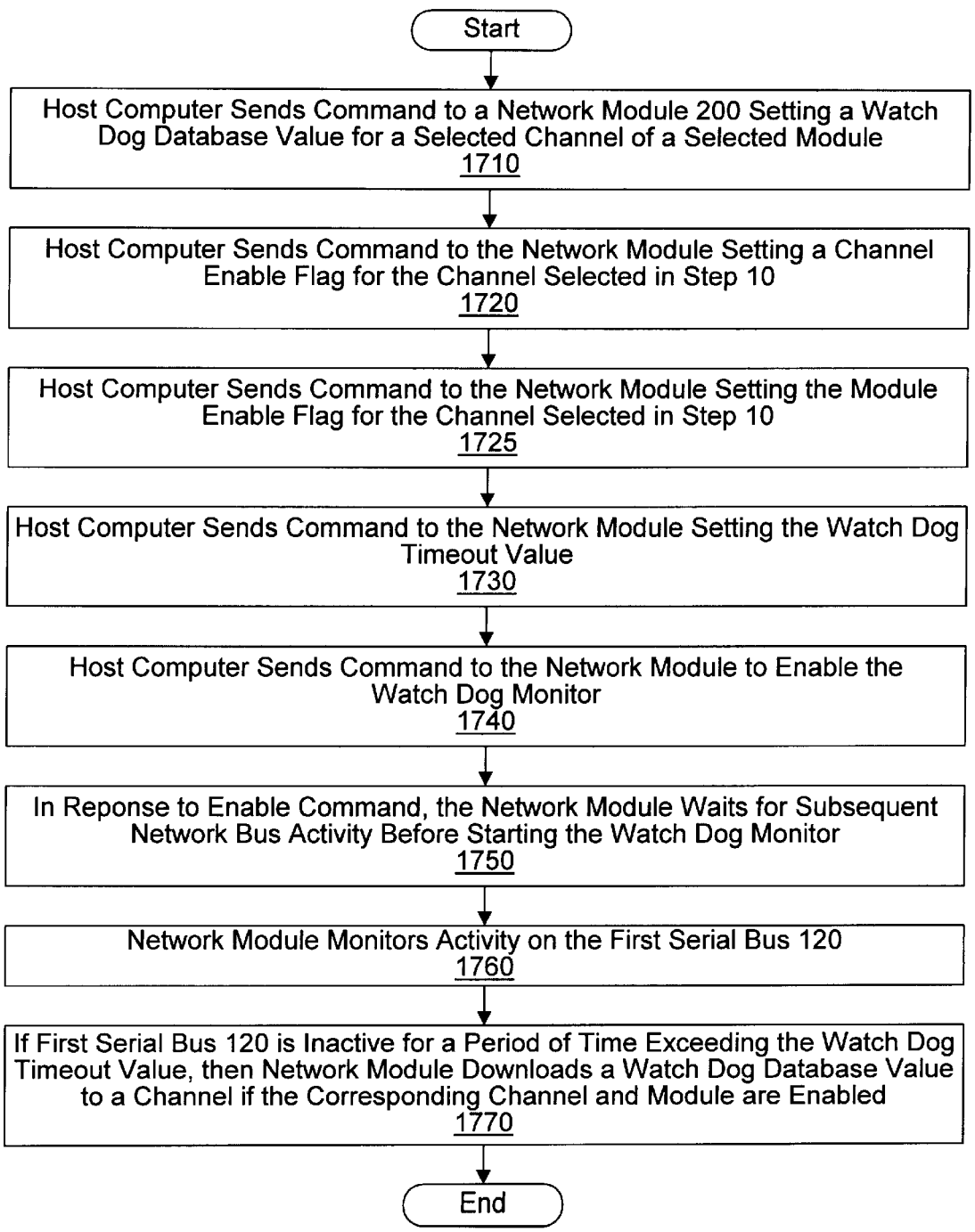
FIG. 17 is a flowchart of the watch dog feature according to the present invention.

Refer now to FIG. 17 which presents a flowchart of the Watch Dog Feature according to the present invention. In step 1710, the host computer 100 sends a command to a network module 200 setting a Watch Dog Database value for a selected channel of a selected I/O module 210. In case of a communication failure, the Watch Dog Database value will be written to the selected channel of the selected I/O module 210 subject to the value of the corresponding Channel Enable Flag and Module Enable Flag. In step 1720, the host computer 100 sends a command to the network module 200 setting the Channel Enable Flag for the channel selected in step 10. In step 1725, the host computer 100 sends command to the network module 200 setting the Module Enable Flag for the I/O module 210 selected in step 1710. In step 1730, the host computer 100 sends a command to the network module 200 setting the Watch Dog Timeout value. In step 1740, the host computer 100 sends a command to the network module 200 to enable the Watch Dog Monitor for the network module 200. In response to receiving the enable command, the network module 200 waits for subsequent network bus activity (i.e. any subsequent activity on the network bus 120) before starting the Watch Dog Monitor as shown in step 1750. In step 1760, the network module 200 monitors the activity on network bus 120. If the network bus 120 is inactive for a period of time exceeding the Watch Dog Timeout value, then as shown in step 1770 the network module downloads the values from the Watch Dog Database subject to the values of the respective Module Enable Flags and the Channel Enable Flags.

Snap Shot and Snap Shot Restoration Features

The Snap Shot feature of the present invention allows the user to capture the state of a module bank for later use as a power up configuration upon the next power-up event. When computer 100 sends a Snap Shot command to a network module 200, the network module 200 captures the state of the whole module bank into a data structure called the Snap Shot Image which is stored in non-volatile memory (preferably FLASH memory) resident within the network module 200. The Snap Shot Image stores (a) the state of the network module 200 itself, and (b) the address, identity, and state of the all the I/O modules 210 connected to the network module 200 via the local bus 240. The identity of an I/O module 210 comprises its Module ID and its Hot Swap ID. The state of an I/O module 210 is represented by the contents of its register spaces.

The Snap Shot Restoration feature of the present invention operates as follows. If the network module 200 should loose power, upon regaining power, the network module 200 will automatically attempt to configure the module bank with the states stored in the Snap Shot Image. Upon the power-up event, the network module scans the addresses of the module bank to detect and locate I/O modules 210. Recall that a status read (Function Code 1) with respect to a given address reports the existence and status of the corresponding terminal base and I/O module 210. Suppose that an I/O module 210 is detected at address X. The network module 200 first reads the Hot Swap ID from the I/O module 210. [As discussed above, the Hot Swap ID is one of the fields of the Module Information Structure (MIS) which is stored in non-volatile memory in the I/O module 210.] The network module 200 then determines if the Snap Shot Image contains the image of a module associated with address X. If such an image module exists for address X, the network module 200 compares the Hot Swap ID of the image module with the Hot Swap ID of the current physical module to determine if the current module is compatible for receiving the state information of the image module. If the Hot Swap IDs indicate compatibility, the network module 200 downloads the image module state information to the current physical module. The download involves writing to the current physical module the register space contents of the image module. After performing this download, the network module 200 searches for any remaining I/O modules 210 of the module bank which have not yet been located.

If the Hot Swap IDs of the image module and the corresponding current physical module are equal, the network module 200 downloads to the current physical module the factory default configuration settings and data values recorded in the MIS of the current physical module. It is noted that if the Hot Swap IDs are equal, the MIS read may be aborted after reading the Hot Swap ID. If the Hot Swap IDs are not equal, the remainder of the MIS must be read to determine the factory default settings for the physical module. Recall that the Hot Swap IDs of I/O modules 210 are defined such that I/O modules 210 with identical Hot Swap IDs have the same register space architecture, and therefore are compatible with one another.

The network module 200 must be enabled by computer 100 to perform Snap Shot Restoration. Software running on computer 100 allows the user to enable or disable the Snap Shot Restoration feature for individual module banks. If Snap Shot Restoration has not been enabled for a given module bank, the I/O modules 210 of the module bank are restored with their respective factory default settings upon the next power-up event.

In addition to the Snap Shot command, the network module 200 provides a Piecewise Snapshot Updating feature. Namely, the individual components of information stored in the Snap Shot Image (described below) may be updated by commands sent from computer 100.

In combination, the Snap Shot command, Piecewise Snapshot Updating, and the Snap Shot Restoration features allow the user to protect the time and effort invested in achieving an optimal system configuration. These features allow the MDIO system to maintain performance in spite glitches in power or user-intended power cycling.

Prior to issuing a Snap Shot command, the user configures the state of the module bank. Software running on computer 100 allows the user to write command, configuration, and/or data values to any of the modules/channels of the MDIO system. The Snap Shot command causes a selected network module to capture the following information into the Snap Shot Image which is stored in non-volatile memory within the network module 200.

(1) The attribute and range settings for each channel of each I/O module of the module bank.
(2) The output values of each output channel of the module bank; the output values are given by the data register values which correspond to the output channel.
(3) The Watch Dog Storage, i.e. all the Watch Dog data values, Module Enable Flags, and Channel Enable Flags for each channel/module of the module bank.

As mentioned above, computer 100 and network module 200 support a Piecewise Snapshot Updating feature whereby computer 100 may send commands to update individual components of information in the Snap Shot Image.

As an example, suppose that the user applies power to a single network module 200. Then, if the Snap Shot Restoration feature has been enabled for this network module 200, the network module 200 will restore the whole module bank to an operational state as defined by the Snap Shot Image in non-volatile memory. Thus, the module bank will assume a desirable functional state even though computer 100 and the remaining module banks of the MDIO system are powered down.

FIG. 18A illustrates the typical flow of events in connection with the Snap Shot Feature. As shown in step 1802, the user initially configures a module bank as desired. Software running on computer 100 allows the user to execute commands which control the configuration, data, and command registers of any channel/module of the MDIO system. In step 1804, computer 100 sends a Snap Shot command to the network module 200. In response to receiving the Snap Shot command, as shown in step 1806 the network module 200 captures an image of the entire module bank into non-volatile memory resident in the network module 200. The contents of the Snap Shot Image is enumerated above. In step 1807, computer 100 optionally sends one or more snapshot update commands to modify pieces of information in the Snap Shot Image. In one embodiment, the user initiates these snapshot update commands through inputs provides to a software user interface running on computer 100. It is noted that step 1807 may be performed before or after step 1808.

In step 1808, computer 100 sends a command to the network module 200 to enable the Snap Shot Restoration Feature. In response to the enable command, as shown in step 1810, the network module 200 configured itself to restore the states capture in the Snap Shot Image upon the next power-up event. It is noted that computer 100 may also issue a command to disable (not shown in the Figure) the Snap Shot Restoration Feature.

Figure 18B:
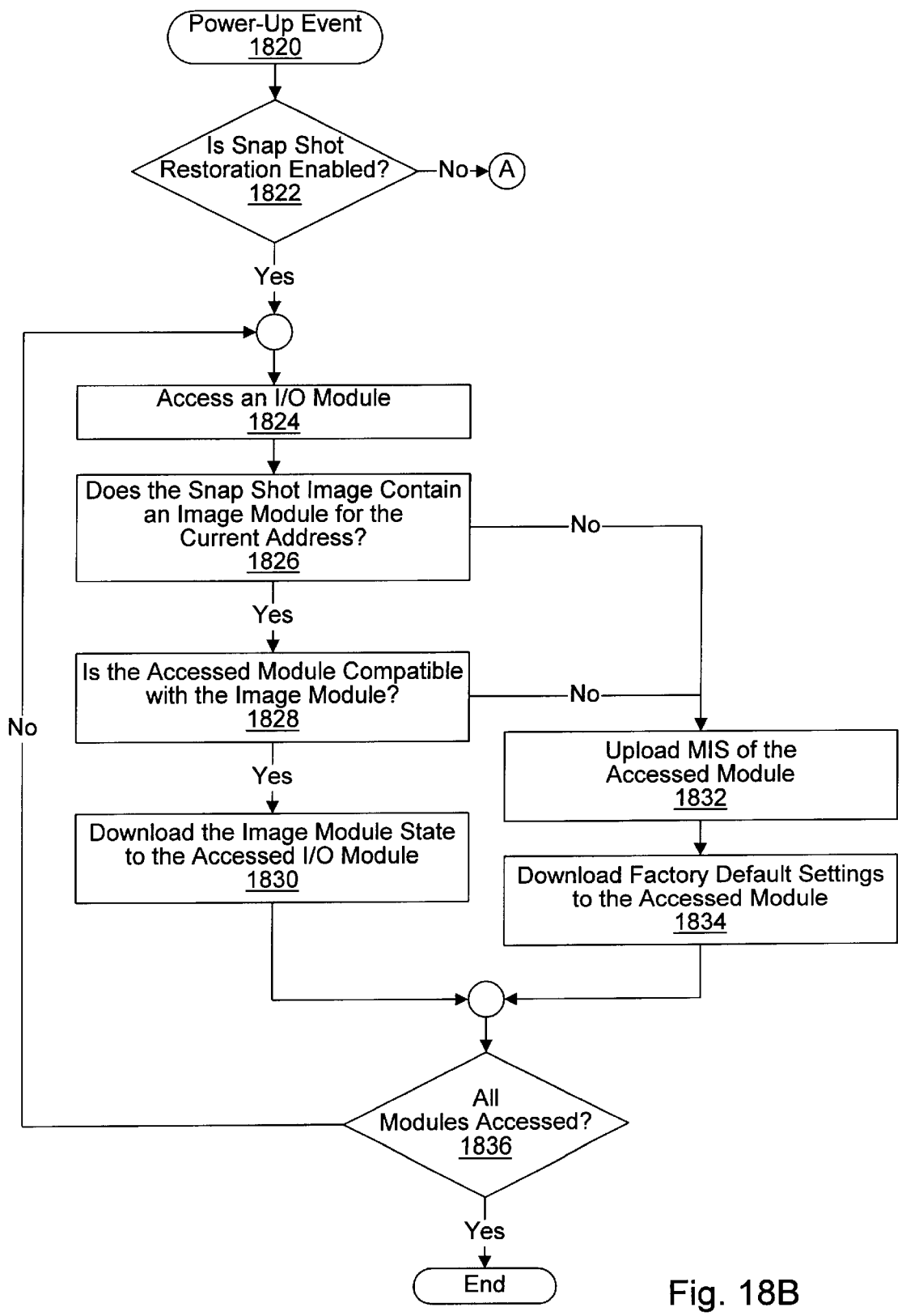
FIG. 18B illustrate the method of Snap Shot Restoration according to the present invention.

Refer to FIG. 18B for a flowchart illustrating the method of Snap Shot Restoration according to the present invention. The method is initiated upon a power up event as shown in step 1820. A power-up event is said to occur when power is applied to a network module 200. After the power-up event, the network module 200 determines if the Snap Shot Restoration feature has been enabled for the network module 200 as shown in step 1822. If the Snap Shot Restoration feature has not been enabled for the network module 200, Snap Shot Restoration is not performed, and I/O modules are configured according their default settings stored in their respective Module Information Structures. Flow Connector A is a placeholder for the remainder of the flowchart which is given FIG. 18C.

If Snap Shot Restoration has been enabled, the network module 200 successively interrogates the addresses of the module bank to locate I/O modules 210. In step 1824, the network module 200 accesses an I/O module 200. Recall that by performing a read with Function Code set to 1, the network module 200 may determine the existence and status of an I/O module at any given module bank address. In step 1826, the network module 200 consults the Snap Shot Image in non-volatile memory to determine if the Snap Shot Image contains an Image Module for the Current Address. In other words, if, at the time the Snap Shot Image was captured, an I/O module existed in the current module position, an image module will have been created for it. If no image module exists for the current address, the method continues with step 1832. If however, there does exists an image module for the current address, method proceeds with step 1828. In step 1828, the network module 200 determines if the accessed I/O module 210 is compatible with the image module. This involves accessing the Hot Swap ID of the accessed I/O emodule 210 by reading the first few words of its MIS, and comparing the Hot Swap ID of the accessed I/O module 210 with the Hot Swap ID of the image module. If the Hot Swap IDs indicate that the accessed module is compatible for receiving the image module, the network module 200 downloads the image module state to the accessed I/O module 210 as shown in step 1830. After downloading the image module information to the I/O module 210, the method continues with step 1836.

If, in step 1828, the Hot Swap IDs indicate that that accessed I/O module 210 is not compatible to receive the image module information, the method proceeds with step 1832.

In step 1832, the network module 200 uploads the MIS from the accessed I/O module 200. It is noted that if step 1832 has been arrived at by way of step 1828, the MIS read operation of step 1832 is a continuation of the MIS read initiated in step 1828. In step 1834, the network module 200 downloads the factory default settings for the accessed I/O module 210 as obtained from the MIS. Step 1836 follows after step 1834.

In step 1836, the network module 200 continues the interrogation of the module bank addresses. If other I/O modules 210 are located, the method proceeds with step 1824; otherwise the method terminates.

Figure 18C:
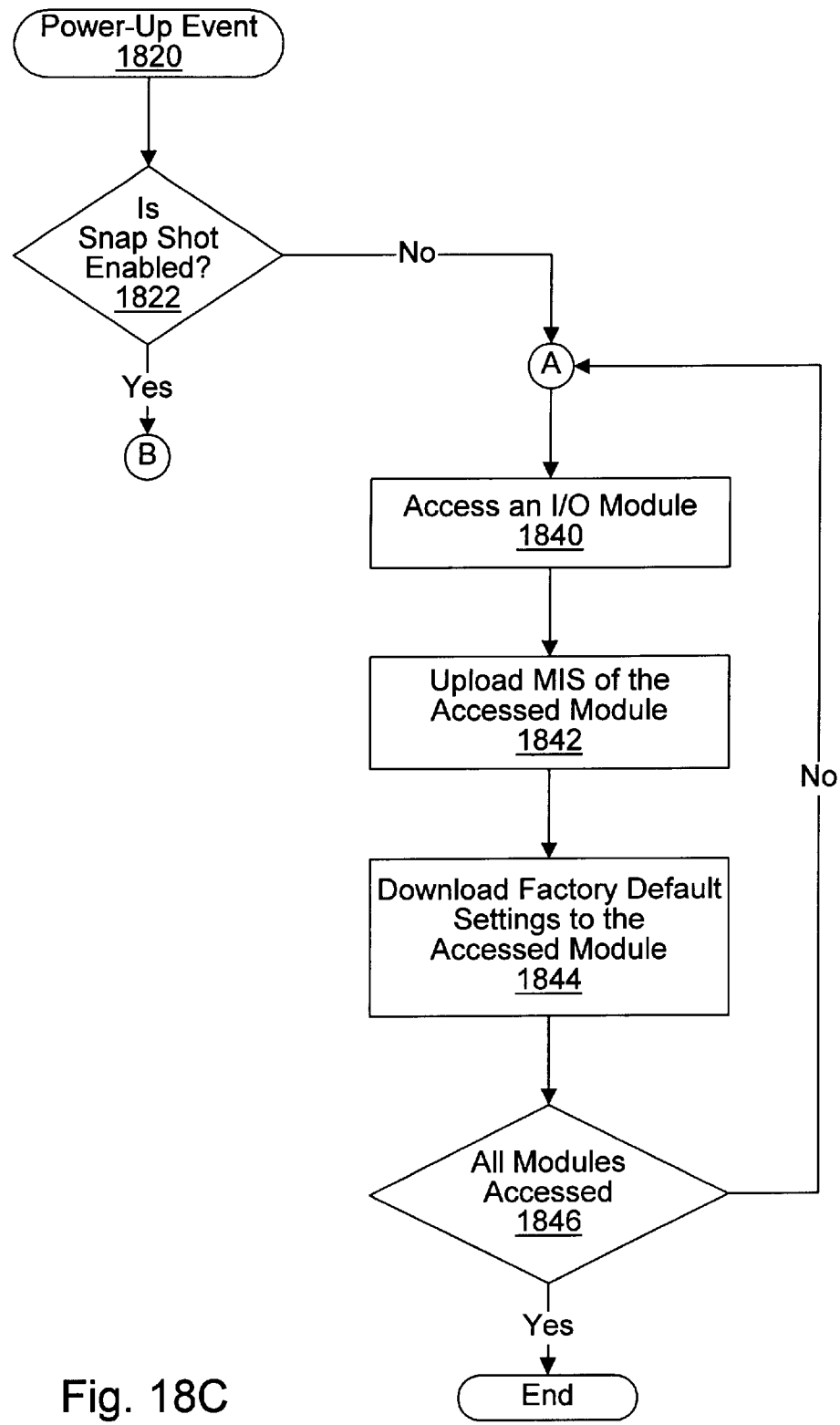
FIG. 18C illustrates the default Power-Up Configuration Sequence according to the present invention in the case the Snap Shot Feature is not enabled.

Refer to FIG. 18C for a flowchart of the default Power-Up Configuration Sequence in the case the Snap Shot Feature is not enabled. Steps 1820 and 1822 are identical to the commonly numbered steps described in connection with FIG. 18B. Flow Connector B represents the flowchart steps of FIG. 18B discussed above. If the Snap Shot Restoration feature is not enabled, the network module 200 successively interrogates addresses of the module bank to locate I/O modules 210. In step 1840, the network module accesses an I/O module 210. In step 1842, the network module 200 uploads the MIS from the accesses I/O module 210. In step 1844, the network module 110 parse the MIS to identify the factory default settings for the accessed I/O module 210, and downloads these defaults settings to the accessed I/O module 210. After downloading the default settings, the network module 200 continues to interrogate the remaining module bank addresses. If another I/O module 210 is located, the method proceeds with step 1840; otherwise the method terminates.

Hot Insertion and Auto-Configuration

The MDIO system of the present invention includes a Hot Insertion and Auto-Configuration feature whereby an I/O module 210 is automatically configured upon being inserted in an active terminal base 220. An active terminal base is one which is electrical contact with a powered network module 200 through the local bus. Thus, in FIG. 5, terminal bases 220A and 220B are active and terminal base 220C is inactive, if the network module 200 is receiving power; whereas all the terminal bases 220A–C are inactive if the network module 200 is not receiving power. In view of the Hot Insertion and Auto-configuration feature of the present invention, I/O modules 210 need not include the software to provide for their own configuration. This allows the I/O modules 210 to be less expensive than in conventional MDIO systems.

When an new I/O module 210 is inserted into an active terminal base 220, the I/O module 210 asserts a signal on the New Module Interrupt Line New_Md*. The network module 200 monitors the New_Md* Line. From the point of view of the network module 200, the active low assertion of the New_Md* Line indicates that one or more I/O modules 210 have been inserted into terminal bases 220. The network module 200 polls each address of the module bank 110 to determine which I/O module(s) 210 are asserting New_Md*. An I/O module 210 is recognized as newly inserted when the MST bits returned in a status read indicate the Unconfigured status. When the network module 200 detects a I/O module 210 which is newly inserted, it consults a Virtual Module Database to discern whether or not the I/O module 210 had a predecessor, i.e. whether another module previously occupied the same terminal base position. Suppose that the current I/O module 210 is the first occupant of its terminal base, i.e. had no predecessor. In this case, the network module 200 reads the MIS of the I/O module 210. From the MIS, the network module 210 extracts the factory default settings stored in the MIS, and downloads these default settings to the I/O module 210. In addition, the network module 210 creates a Virtual Module structure for the I/O module 210 from the information in the MIS. The Virtual Module structure is added to the Virtual Module Database.

The network module 200 continues polling the module bank addresses until the New_Md* Line is observed to be in the de-asserted state indicating that all new I/O modules 210 have been detected and configured.

The Virtual Module Database mentioned above is stored in non-volatile memory within the network module 200. The Virtual Module Database contains Virtual Module Structures. A Virtual Module structure is created when an I/O module is inserted into a terminal base 220 for the first time. The Virtual Module, as originally created, contains an image of the contents of the data register, configuration register, and command register of the corresponding physical I/O module. Furthermore, as computer 100 sends messages to the physical I/O module 210, the network module 200 updates the corresponding virtual module so that the virtual module is a continuous image of the state of the physical I/O module 210. In other words, the virtual module maintains an exact replica of the register spaces of the corresponding I/O module 210. In addition, when the I/O module 210 is removed from its terminal base 220, the virtual module persists. Thus, if computer 100 sends a message to a "missing" I/O module 210, the register space(s) of the virtual module is updated in the same way the "missing" I/O module would have updated its register space(s). In this case, the network module 200 also sends an error message to computer 100 reporting the targeted I/O module as missing. The utility of the Virtual Module structure is realized when the first I/O module is replaced with a second I/O module as described below.

Hot Swap and Configuration Inheritance

In addition to the Hot Insertion and Auto-Configuration feature, the MDIO system of the present invention includes a Hot Swap feature whereby an I/O module 210 may be removed and replaced with another I/O module 210 without powering down the module bank 110. Suppose that a configured I/O module 210 is removed from an active terminal base 220 and another I/O module 210 is inserted into this same terminal base 220. Since the power and ground pins of the I/O module 210 are longer than the reset pin of the I/O module 210, the I/O module 210 receives power first and then is reset as it is inserted into the active terminal base 220. After being reset, the I/O module 210 asserts a New Module Interrupt on the New_Md* Line. The network module 200 detects the new I/O module 210 as above. Once, the new I/O module 210 is located, the network module determines whether or not a Virtual Module structure already exists for the terminal base 220 occupied by the new I/O module 210. In the case under consideration, the Virtual Module structure corresponding to the predecessor I/O module 210 is resident in the Virtual Module Database. Thus, the network module 200 initiates an MIS read of the new I/O module 210 via the SPI serial interface. The network module 200 compares the Hot Swap ID of the new I/O module 210 (obtained from the MIS) with the Hot Swap ID of the virtual module. If the Module IDs indicate that the new I/O module 210 is compatible with the Virtual Module, the network module abandons reading the MIS, and downloads to the new I/O module 210 the current state of the Virtual Module, i.e. the contents of the registers spaces of the virtual module. Recall that the network module 200 updates the virtual module even in the absence of a corresponding physical module. Thus, the new I/O module 210 automatically assumes the state that the predecessor I/O module would have occupied had it not been removed. This configuration inheritance feature implemented by the network module 200 according to the present invention allows an I/O module to be replaced with a I/O module of compatible type while the MDIO system is running. Functionality is restored without the intervention of computer 100. Any configuration that was programmed into the old I/O module, and configuration that was programmed into the virtual module during the time the old module was missing is reprogrammed into the new module.

As an example of modular compatibility, consider two discrete output modules with 8 physical channels which source 24 volts and 48 volts respectively. Since, the 24 volt module is a subset of the 48 volt module, the 24 volt module admits configuration inheritance from the 48 volt module.

If the Hot Swap ID comparison indicates that the new I/O module 210 is not compatible to receive the virtual module information, the network module 200 determines if the Snap Shot Restoration has been enabled for the module bank. If Snap Shot Restoration has been enabled, the network module 200 consults the Snap Shot Image in non-volatile memory to determine if an image module exists for the currently module address. If an image module exists, the network module 200 compares the Hot Swap ID of the new I/O module 210 with the Hot Swap ID of the image module. If the Hot Swap ID comparison indicates that the new I/O module is compatible with the image module, the image module state information is downloaded to the new I/O module 210. Furthermore, the Virtual Module structure is updated to replicate the current state of the new I/O module 210, i.e. the image module information is copied to the Virtual Module structure.

If the Hot Swap ID comparison indicates that the new I/O module 210 is not suitable to receive the image module information, the network module 210 continues reading the MIS of the new I/O module 210, and downloads to the I/O module the factory default settings extracted from the MIS. Also the network module 200 updates the Virtual Module structure to replicate the state (i.e. the default settings) of the new I/O module 210.

Figure 19A:
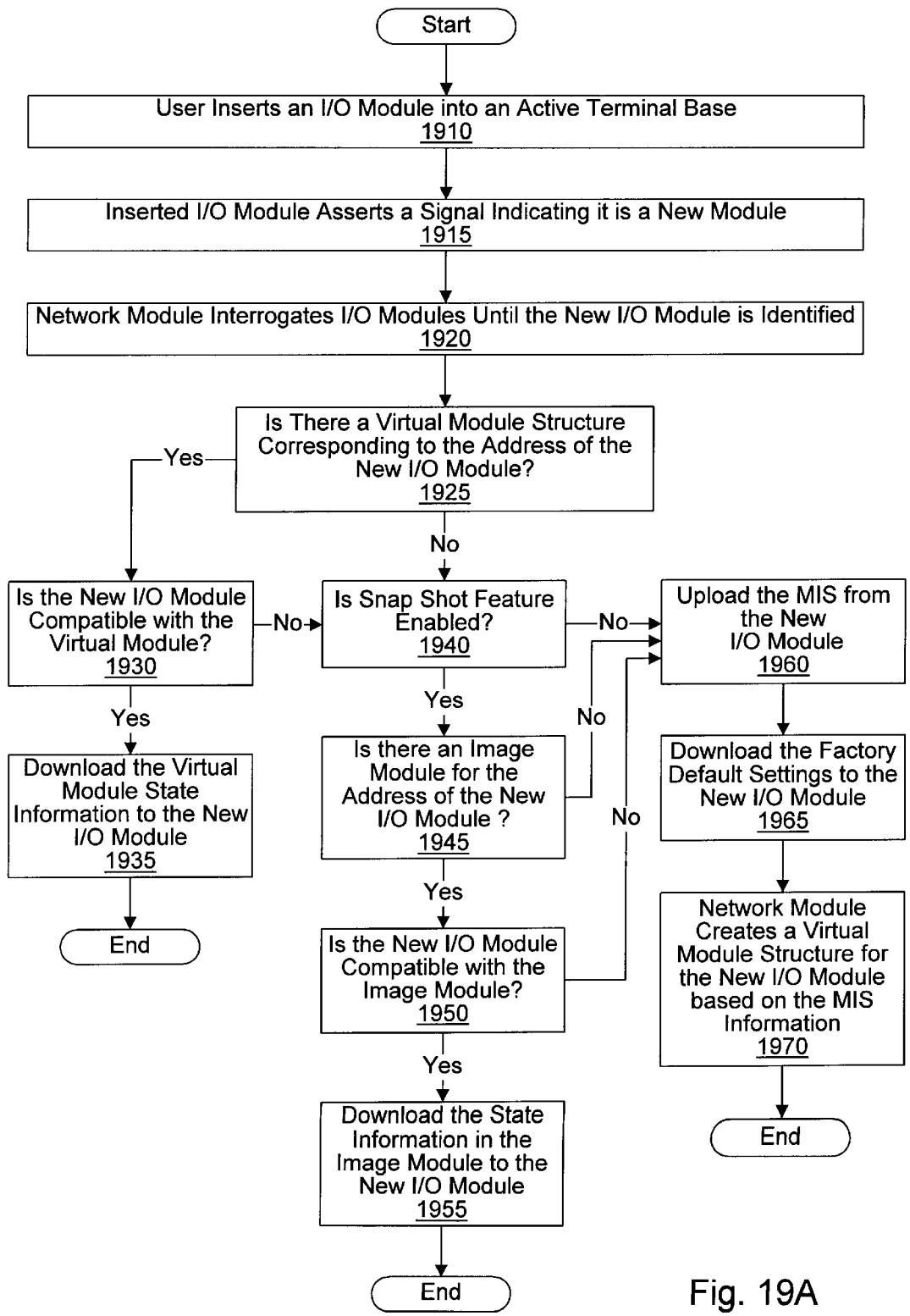
FIG. 19A illustrates the Hot Insertion, Auto-Configuration, and Hot-Swap Features of the present invention.

Refer now to FIG. 19A which illustrates the method connected with the Hot Insertion, Auto-Configuration, and Hot-Swap Features of the present invention. In step 1910, the user inserts an I/O module 210 into an active terminal base 220. In step 1915, the new I/O module 210 asserts a signal indicating its status as a newly inserted I/O module. In the preferred embodiment this involves driving low the New_MD* Line of the local bus. In step 1920, the network module 200 interrogates the module bank addresses until the new module is located. In step 1925, the network module consults the Virtual Module Database to determine if a Virtual Module structure exists for the address of the new I/O module. If a Virtual Module structure does not exist for the current address, the method continues with step 1940. However, if a Virtual Module exists for the current address, the network module determines if the new I/O module 210 is compatible to receive the state information stored in the Virtual Module as shown in step 1930. As described above, this involves comparing the Hot Swap ID of the Virtual Module with the Hot Swap ID of the new I/O module. The later is read from the MIS of the new I/O module. If the new I/O module is determined to be incompatible with the Virtual Module structure, the method proceeds to step 1940. However, if the new I/O module is compatible with the Virtual Module structure, the network module 200 downloads the state information in the Virtual Module to the new I/O module as shown in step 1935. After step 1935, the method terminates.

In step 1940, the network module 200 determines if Snap Shot Restoration has been enabled. If Snap Shot Restoration has not been enabled, the method proceeds with step 1960. However, if Snap Shot Restoration has been enabled, the network module 200 determines if there exists an image module in the Snap Shot Image for the current address as shown in step 1945. If an image module does not exist for the current address, the method proceeds with step 1960. However, if an image module does exist for the current address, the network module 200 determines if the new I/O module is suitable for receiving the state information in the image module as shown in step 1950. Again, this involves comparing the Hot Swap ID of the image module and the Hot Swap ID of the new I/O module. If the new I/O module is determined to be incompatible with the image module, the method proceeds with step 1960. However, if the new I/O module 210 is compatible with the image module, the state information in the image module is downloaded to the new I/O module as shown in step 1955. After step 1955, the method terminates.

In step 1960, the network module 200 finishes reading the MIS from the new I/O module 210. It is noted that an MIS read is initiated in step 1930 in order to determine the Hot Swap ID of the new I/O module. Similarly, an MIS read may be initiated in step 1940 to determine the Hot Swap ID of the new I/O module. Thus, if step 1960 is arrived at by way of step 1930 or step 1940 then the MIS read of step 1960 is may be a continuation of the MIS read initiated in step 1930 or 1940 respectively. In step 1965, the network module 200 extracts the factory default settings of the new I/O module 210 from the MIS, and downloads the default settings to the new I/O module 210. After step 1965, the network module 200 creates a virtual module structure for the new I/O module based on the MIS information.

Figure 19B:
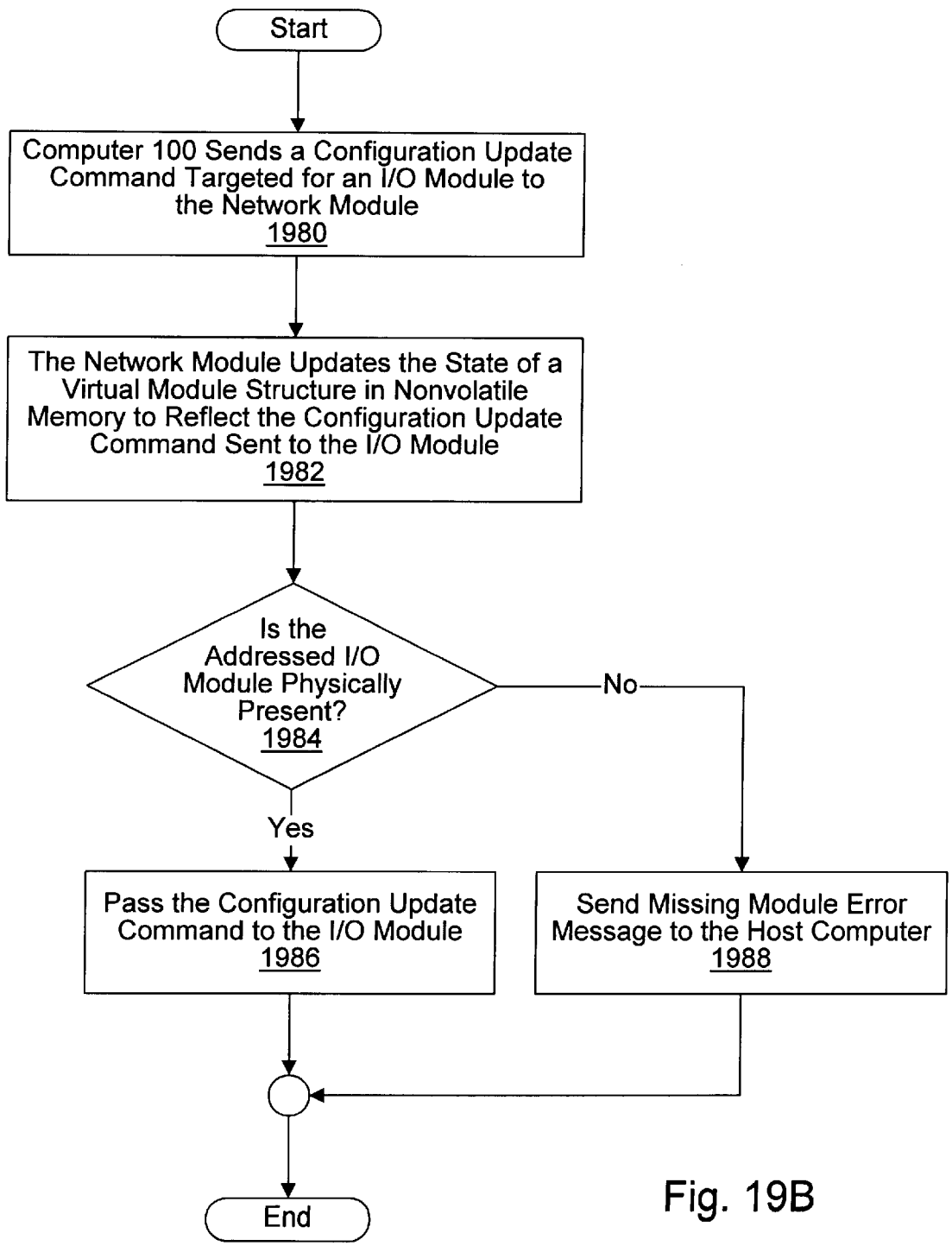
FIG. 19B illustrates the method by which the network module 200 maintains a virtual module structure even in the absence of the corresponding physical I/O module 210.

Refer now to FIG. 19B which illustrates the method by which the network module 200 maintains the virtual module structure even in the absence of the corresponding physical I/O module 210. FIG. 19B assumes that a virtual module structure has been created for an I/O module 210 corresponding to a particular terminal base address. In step 1980, the computer sends a configuration update command destined for an I/O module to the network module 200. In step 1982, the network module 200 receives the configuration update command and updates the state of the virtual module structure in non-volatile memory. The virtual module structure maintains an image of the register spaces of the I/O module 210 whether or not the I/O module 210 is physically present. Thus, in step 1984, the network module 200 determines whether the addressed I/O module is physically present. If the addressed I/O module is physically present, the network module 200 passes the configuration update command to the I/O module 210 as shown in step 1986. If the addressed I/O module is not physically present at the addressed terminal base location, the network module 200 sends a missing module error message to the computer 100.

Conclusion

Although the system and method of the present invention has been described in connection with several representative embodiments, it is not intended to be limited to the specific forms set forth herein, but on the contrary, it is intended to cover such alternatives, modifications, and equivalents, as can be reasonably included within the spirit and scope of the invention as defined by the appended claims.

We claim:

1. An I/O system with improved communication capabilities, the system comprising:

at least one communication module;

one or more I/O modules;

a physical bus coupled between the communication module and each of said one or more I/O modules, wherein said physical bus comprises a parallel bus and a serial bus;

wherein said communication module is a master of the physical bus;

wherein each of said one or more I/O modules includes a memory, wherein said communication module is configured to read and write said memory of each of said one or more I/O modules via said parallel bus;

wherein each of said one or more I/O modules includes non-volatile memory, wherein said non-volatile memory stores a module information structure (MIS) corresponding to said I/O module, wherein said MIS comprises one or more attributes and one or more programmable states of said I/O module;

wherein said communication module is operable to read the MIS of each of said one or more I/O modules when said I/O module is coupled to said physical bus, wherein said reading the MIS is performed through said serial bus.

2. The system of claim 1, wherein said physical bus includes a power line, wherein the communication module provides power to said one or more I/O module through said power line.

3. The system of claim 1, further comprising one or more terminal bases, wherein said one or more terminal bases couple together to form said physical bus;

wherein said one or more I/O modules are coupled to respective ones of said one or more terminal bases;

wherein each of said one or more terminal bases includes a predecessor connector and a successor connector, wherein said predecessor connector is adapted for coupling to a preceding terminal base or to said communication module, wherein said successor connector is adapted for coupling to a succeeding terminal base, wherein said one or more terminal bases are coupled in a linear succession, wherein said communication module couples to the predecessor connector of a first terminal base of said linear succession;

wherein said predecessor connector provides physical bus connectivity to said preceding terminal base or to said communication module, wherein said successor connector provides physical bus connectivity to said succeeding terminal base.

4. The system of claim 3, wherein each of said one or more terminal bases allow connectivity to any of said one or more I/O modules.

5. The system of claim 4, wherein each of said terminal bases in said linear succession is assigned an address depending on the position of said terminal base in said linear succession, wherein each of said I/O modules inherits the assigned address of said respective terminal base to which said I/O module is coupled.

6. The system of claim 5, wherein said physical bus includes an address assignment bus, wherein said address assignment bus comprises a plurality of address assignment lines;

wherein each terminal base of said linear succession is operable to receive an integer value asserted on the address assignment lines of its predecessor connector, increment said integer value, and assert said incremented integer value on the address assignment lines of its successor connector.

7. The system of claim 6, wherein said communication module asserts a fixed constant value on the address assignment lines coupling between said communication module and said first terminal base.

8. The system of claim 5, wherein said parallel bus includes address lines, wherein said communication module asserts an address value on said address lines in order to select a particular I/O module for data communication, wherein each of said I/O modules is operable to compare the address value asserted on said address lines with said assigned address value inherited from said respective terminal base, wherein said communication module is allowed access to at least a portion of the memory in a respective I/O module when said address value agrees with said assigned address value of said respective I/O module.

9. The system of claim 1, wherein said communication module is operable to read the MIS of each of said one or more I/O modules when said I/O module is electrically uncoupled from said physical bus, wherein said reading the MIS is performed through said serial bus.

10. The system of claim 1, wherein said one or more attributes comprise information on one or more channels, calibration information, module description information and semaphore request time related to said I/O module.

11. The system of claim 1, wherein said communication module comprises an activity monitor for sensing a communication failure condition.

12. The system of claim 1, wherein said non-volatile memory is operable to read and write data.

13. A method for assigning addresses to one or more I/O modules in a module bank, the module bank comprising a communication module, a plurality of terminal bases, and said one or more I/O modules, wherein each of said terminal bases includes a predecessor connector and a successor connector, wherein said terminal bases are coupled in a linear succession through their predecessor and successor connectors, wherein the predecessor connector of a first terminal base of said linear succession couples to said communication module, said method comprising:

said communication module providing a fixed integer value to the predecessor connector of said first I/O module;

each of said terminal bases in said linear succession performing the following steps:
reading a first integer value prevailing at its predecessor connector;
adding one to said first integer value to generate an incremented integer value, wherein said incremented integer value is useable as an address for said terminal base;
providing said incremented integer value to its successor connector;

inserting each of said one or more I/O modules into one of said terminal bases;

assigning each of said one or more I/O modules an address value based on the terminal base in which it is inserted.

14. The method of claim 13, wherein said assigning each of said one or more I/O modules an address value comprises using the incremented integer value of the terminal base in which it is inserted as said address value.

15. The method of claim 13, wherein said assigning each of said one or more I/O modules an address value comprises using said first integer value read from said precessor connector of the terminal base in which said I/O module is inserted.

* * * * *